(12) United States Patent
Williams et al.

(10) Patent No.: US 11,984,768 B2
(45) Date of Patent: May 14, 2024

(54) HYDROELECTRIC GENERATOR FOR FAUCET AND FLUSH VALVE

(71) Applicant: Zurn Industries, LLC, Milwaukee, WI (US)

(72) Inventors: Chadwick Williams, Milwaukee, WI (US); Jack Salay, Milwaukee, WI (US); Cesar Leon, Milwaukee, WI (US); Matt Gjertson, Milwaukee, WI (US); Dan Danowski, Milwaukee, WI (US); Glen Trickle, Milwaukee, WI (US); Karthik Sundaramoorthy, Milwaukee, WI (US); Keith Mercer, Milwaukee, WI (US); Long Le, Milwaukee, WI (US); Jon Huddle, Milwaukee, WI (US); Robert Weaver, Milwaukee, WI (US); Robert Saadi, Milwaukee, WI (US); Vipresh Jain, Milwaukee, WI (US); Keith Boucher, Milwaukee, WI (US); Brandon Feil, Milwaukee, WI (US)

(73) Assignee: ZURN WATER, LLC, Milwaukee, WI (US)

( * ) Notice: Subject to any disclaimer, the term of this patent is extended or adjusted under 35 U.S.C. 154(b) by 202 days.

(21) Appl. No.: 17/234,588

(22) Filed: Apr. 19, 2021

(65) Prior Publication Data
US 2021/0324828 A1    Oct. 21, 2021

Related U.S. Application Data

(60) Provisional application No. 63/011,915, filed on Apr. 17, 2020.

(51) Int. Cl.
*H02K 11/00* (2016.01)
*E03C 1/04* (2006.01)
(Continued)

(52) U.S. Cl.
CPC .......... *H02K 11/0094* (2013.01); *E03C 1/057* (2013.01); *E03C 1/04* (2013.01); *E03D 1/30* (2013.01); *Y10T 137/9464* (2015.04)

(58) Field of Classification Search
CPC ... F03B 13/00; H02K 7/1823; H02K 11/0094; F21V 33/004; E03C 1/04; E03C 1/0404;
(Continued)

(56) References Cited

U.S. PATENT DOCUMENTS

| | | |
|---|---|---|
| 4,520,516 A | 6/1985 | Parsons |
| 4,731,545 A | 3/1988 | Lerner et al. |

(Continued)

FOREIGN PATENT DOCUMENTS

| | | |
|---|---|---|
| CA | 2738379 A1 | 4/2011 |
| EP | 1147594 B1 | 10/2001 |

(Continued)

*Primary Examiner* — Daphne M Barry
(74) *Attorney, Agent, or Firm* — Husch Blackwell LLP

(57) ABSTRACT

A plumbing system for generating electrical power, including a hydroelectric generator assembly configured to generate power, a power source arranged in parallel with the hydroelectric generator assembly, and an interconnecting power harness in communication with the hydroelectric generator assembly and the power source. The plumbing system additionally includes a plumbing fixture in communication with the interconnecting power harness. The plumbing fixture includes a valve and a sensor configured to detect the presence of a user. The hydroelectric generator assembly is configured to provide power to the valve.

20 Claims, 18 Drawing Sheets

(51) Int. Cl.
*E03C 1/05* (2006.01)
*E03D 1/30* (2006.01)

(58) Field of Classification Search
CPC ........ E03C 2001/0418; Y10T 137/9464; E21S 9/046; F05B 2220/7064; F05B 2260/42
See application file for complete search history.

(56) References Cited

U.S. PATENT DOCUMENTS

| | | | |
|---|---|---|---|
| 4,839,039 A | 6/1989 | Parsons et al. | |
| 4,854,499 A | 8/1989 | Neuman | |
| 4,951,915 A | 8/1990 | Piao | |
| 5,349,985 A | 9/1994 | Fischer | |
| 5,566,702 A | 10/1996 | Philipp | |
| 5,813,655 A | 9/1998 | Pinchott et al. | |
| 5,819,336 A | 10/1998 | Gilliam et al. | |
| 5,868,311 A | 2/1999 | Cretu-Petra | |
| 6,036,333 A | 3/2000 | Spiller | |
| 6,509,652 B2 | 1/2003 | Yumita | |
| 6,559,553 B2 | 5/2003 | Yumita et al. | |
| 6,768,218 B2 | 7/2004 | Yumita | |
| 6,876,100 B2 | 4/2005 | Yumita | |
| 6,895,985 B2 | 5/2005 | Popper et al. | |
| 7,005,758 B2 | 2/2006 | Yumita et al. | |
| 7,074,008 B2 | 7/2006 | Motonaka et al. | |
| 7,075,768 B2 | 7/2006 | Kaneko | |
| 7,121,495 B2 | 10/2006 | Caamano | |
| 7,252,431 B1 | 8/2007 | Caramanna | |
| 7,253,536 B2 | 8/2007 | Fujimoto et al. | |
| 7,270,748 B1 | 9/2007 | Lieggi | |
| 7,392,817 B2 | 7/2008 | Burlage et al. | |
| 7,458,520 B2 | 12/2008 | Belz et al. | |
| 7,508,318 B2 | 3/2009 | Casella et al. | |
| 7,608,936 B2 | 10/2009 | Shimizu et al. | |
| 7,825,531 B2 | 11/2010 | Tanka et al. | |
| 7,871,057 B2 | 1/2011 | Shimizu et al. | |
| 7,919,877 B2 | 4/2011 | Shimizu et al. | |
| 7,932,618 B2 | 4/2011 | Baarman et al. | |
| 7,945,973 B2 | 5/2011 | Khorshid | |
| 7,956,480 B2 | 6/2011 | Onodera et al. | |
| 8,006,712 B2 | 8/2011 | Boey | |
| 8,152,142 B2 | 4/2012 | Hirakiui | |
| 8,355,822 B2 | 1/2013 | Jonte et al. | |
| 8,408,517 B2 | 4/2013 | Jonte et al. | |
| 8,413,952 B2 | 4/2013 | Jonte et al. | |
| 8,421,032 B2 | 4/2013 | Lang et al. | |
| 8,448,664 B2 | 4/2013 | Lin et al. | |
| 8,448,715 B2 | 5/2013 | Munro | |
| 8,461,705 B2 | 6/2013 | Kuroishi et al. | |
| 8,464,998 B2 | 6/2013 | Maercovich | |
| 8,686,586 B1 | 4/2014 | Tsai | |
| 8,695,132 B2 | 4/2014 | Wu | |
| 8,698,333 B2 | 4/2014 | Glasser et al. | |
| 8,800,960 B2 | 8/2014 | Hsu | |
| 8,807,521 B2 | 8/2014 | Dunki-Jacobs et al. | |
| 8,840,845 B2 | 9/2014 | Soler et al. | |
| 8,878,383 B2 | 11/2014 | Kuroishi et al. | |
| 8,893,320 B2 | 11/2014 | Klicpera | |
| 9,062,439 B2 | 6/2015 | Lee | |
| 9,273,798 B2 | 3/2016 | Maercovich | |
| 9,359,747 B2 | 6/2016 | Wawrla | |
| 9,366,014 B2 | 6/2016 | Wawrla | |
| 9,486,817 B2 | 11/2016 | Patton et al. | |
| 9,574,331 B2 | 2/2017 | Wright | |
| 9,574,336 B1 | 2/2017 | Maercovich | |
| 9,587,384 B2 | 3/2017 | Schoolcraft et al. | |
| 9,702,128 B2 | 7/2017 | Sawaski | |
| 9,808,397 B2 | 11/2017 | Breau et al. | |
| 9,927,276 B2 | 3/2018 | Della-Monica | |
| 9,958,418 B2 | 5/2018 | Kaneko | |
| 10,077,848 B2 | 9/2018 | Maercovich | |
| 10,087,608 B2 | 10/2018 | Dobizl et al. | |
| 10,183,853 B2 | 1/2019 | Jurczyszak et al. | |
| 10,208,465 B2 | 2/2019 | Martin | |
| 10,227,760 B2 | 3/2019 | Horwitz et al. | |
| 10,267,432 B2 | 4/2019 | Tsai | |
| 10,273,668 B2 | 4/2019 | Murata et al. | |
| 10,309,809 B2 | 6/2019 | Ruhnke | |
| 10,323,969 B2 | 6/2019 | Geller et al. | |
| 10,386,211 B2 | 8/2019 | Ruiz Cortez | |
| 10,428,498 B1 | 10/2019 | Montague | |
| 10,443,561 B1 | 10/2019 | Yang | |
| 10,456,793 B2 | 10/2019 | Nikles | |
| 10,471,375 B1 | 11/2019 | Zerban et al. | |
| 10,508,423 B2 | 12/2019 | Herbert et al. | |
| 10,514,172 B2 | 12/2019 | Acker | |
| 10,544,571 B2 | 1/2020 | Beck | |
| 10,590,636 B2 | 3/2020 | Schoenbeck et al. | |
| 10,745,893 B2 | 8/2020 | Silverstein et al. | |
| 10,753,337 B2 | 8/2020 | Defrank et al. | |
| 10,767,354 B2 | 9/2020 | Tracy | |
| 10,815,958 B2 | 10/2020 | Kah, III | |
| 10,819,186 B2 | 10/2020 | Conness et al. | |
| 10,837,161 B2 | 11/2020 | Loeck et al. | |
| 10,907,330 B2 | 2/2021 | Zhou et al. | |
| 10,928,229 B2 | 2/2021 | Sankaran et al. | |
| 10,934,992 B2 | 3/2021 | Kuroishi et al. | |
| 10,947,740 B2 | 3/2021 | Sighinolfi | |
| 2004/0258567 A1 | 12/2004 | Kokin et al. | |
| 2005/0183195 A1 | 8/2005 | Hsu | |
| 2006/0283973 A1 | 12/2006 | Bean | |
| 2007/0176774 A1 | 8/2007 | Jahrling et al. | |
| 2008/0022920 A1 | 1/2008 | Custodi | |
| 2008/0169249 A1 | 7/2008 | Ter Stege | |
| 2008/0231056 A1 | 9/2008 | Wen | |
| 2008/0284175 A1 | 11/2008 | Nagler | |
| 2009/0008943 A1 | 1/2009 | Kemper | |
| 2009/0121044 A1 | 5/2009 | Lo et al. | |
| 2009/0154524 A1 | 6/2009 | Girelli | |
| 2009/0188995 A1 | 7/2009 | Onodera et al. | |
| 2010/0308587 A1 | 12/2010 | Tu et al. | |
| 2011/0043113 A1 | 2/2011 | Weng et al. | |
| 2011/0203364 A1* | 8/2011 | Staake | F24D 19/1063 73/198 |
| 2012/0018179 A1 | 1/2012 | Munro | |
| 2012/0031498 A1 | 2/2012 | Carmel et al. | |
| 2012/0137426 A1 | 6/2012 | Wang | |
| 2012/0192965 A1 | 8/2012 | Popper et al. | |
| 2012/0273703 A1 | 11/2012 | Hsu et al. | |
| 2012/0318386 A1 | 12/2012 | Guzman | |
| 2014/0246099 A1* | 9/2014 | Herbert | F03B 13/00 137/560 |
| 2014/0312253 A1 | 10/2014 | Gan | |
| 2016/0077530 A1 | 3/2016 | Moran et al. | |
| 2017/0009435 A1 | 1/2017 | Burns | |
| 2017/0089317 A1 | 3/2017 | Lin et al. | |
| 2017/0260722 A1* | 9/2017 | Horwitz | G01F 15/06 |
| 2017/0298608 A1 | 10/2017 | Maercovich | |
| 2017/0328045 A1 | 11/2017 | Karei | |
| 2017/0336235 A1 | 11/2017 | Riddick et al. | |
| 2018/0038229 A1 | 2/2018 | Rubinshtein et al. | |
| 2018/0371729 A1 | 12/2018 | Sugino | |
| 2019/0010682 A1 | 1/2019 | Wright | |
| 2019/0063049 A1 | 2/2019 | Wang | |
| 2019/0383693 A1 | 12/2019 | Tonar | |
| 2020/0089262 A1 | 3/2020 | Wales et al. | |
| 2020/0157788 A1 | 5/2020 | Wollmer et al. | |

FOREIGN PATENT DOCUMENTS

| | | |
|---|---|---|
| EP | 1196721 B1 | 5/2006 |
| WO | WO1990010119 A1 | 9/1990 |
| WO | WO2006063586 A1 | 6/2006 |
| WO | WO2008061928 A1 | 5/2008 |
| WO | WO2008026537 A1 | 6/2008 |
| WO | WO2010084593 A1 | 7/2010 |
| WO | WO2011055362 A1 | 5/2011 |
| WO | WO2011096281 A1 | 8/2011 |
| WO | WO2011148399 A1 | 12/2011 |
| WO | WO2012125054 A2 | 9/2012 |
| WO | WO2015198325 A1 | 12/2015 |
| WO | WO2016105296 A1 | 6/2016 |
| WO | WO2017111736 A1 | 6/2017 |
| WO | WO2017111739 A1 | 6/2017 |

(56) References Cited

FOREIGN PATENT DOCUMENTS

| WO | WO2018151675 A1 | 8/2018 |
| WO | WO2018176508 A1 | 10/2018 |
| WO | WO2018218372 A1 | 12/2018 |
| WO | WO2020003017 A1 | 1/2020 |
| WO | WO2020044361 A1 | 3/2020 |
| WO | WO2020188248 A1 | 9/2020 |

* cited by examiner

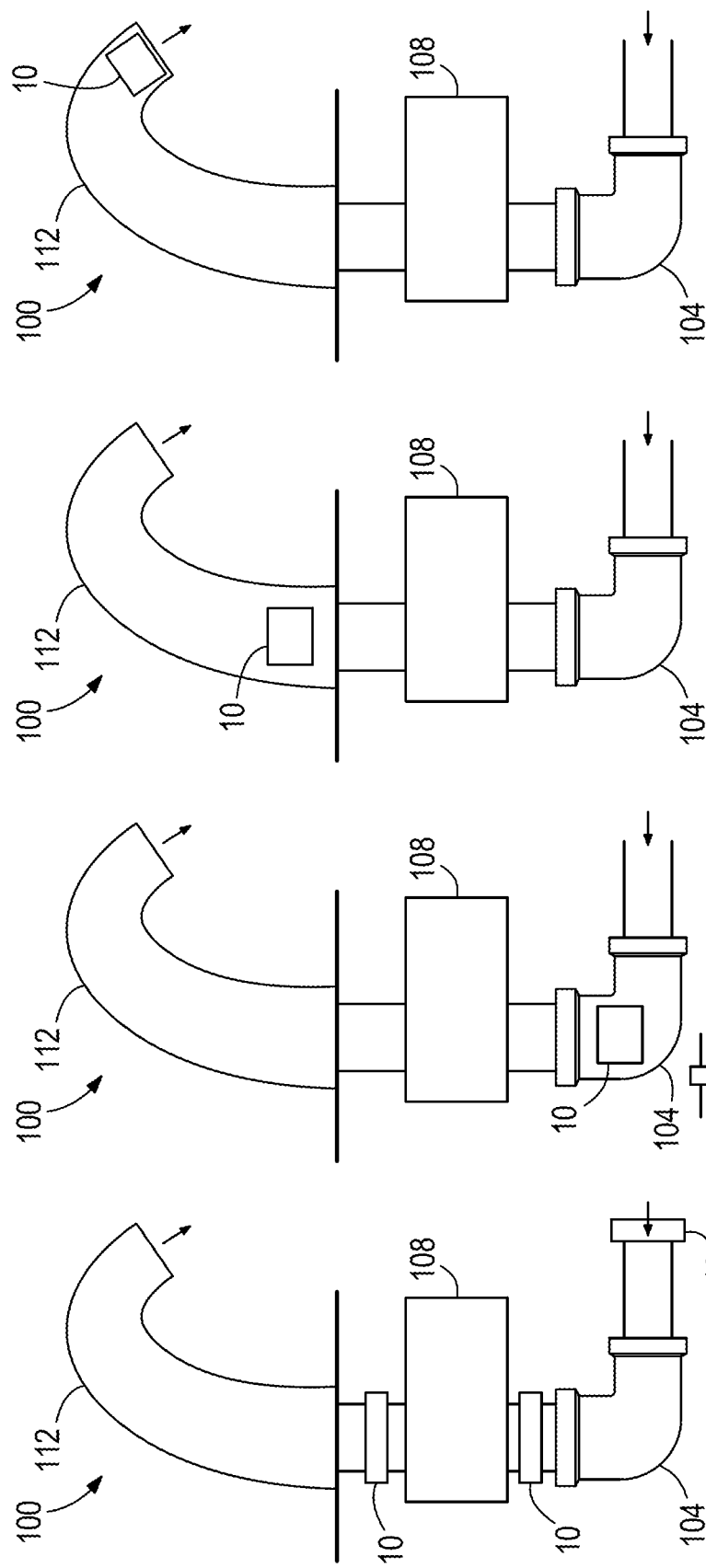

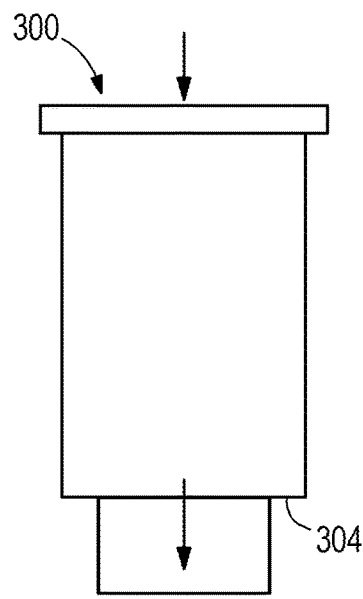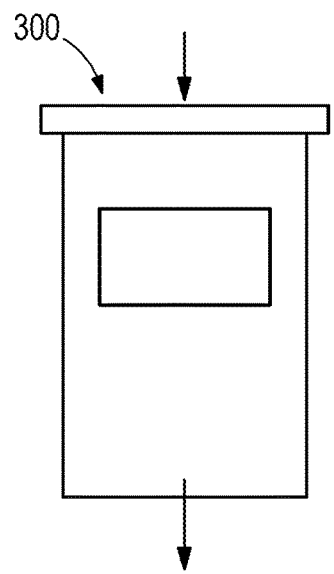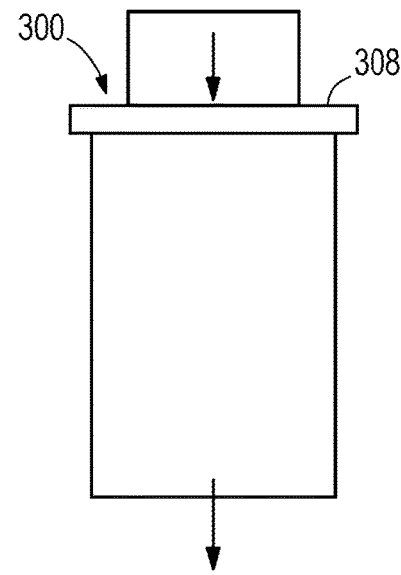
FIG. 10A  FIG. 10B  FIG. 10C
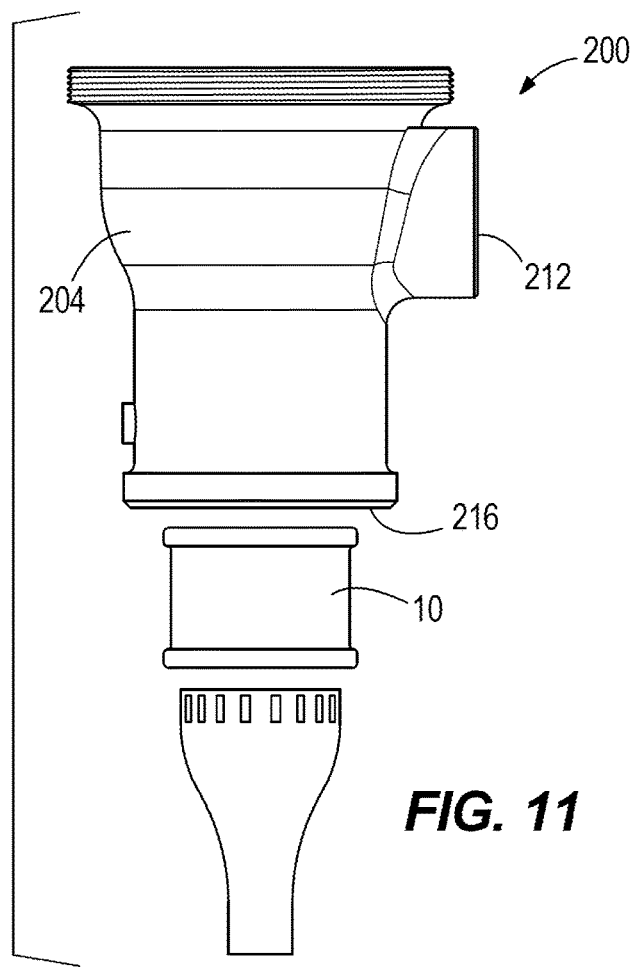
FIG. 11

HYDROELECTRIC GENERATOR FOR FAUCET AND FLUSH VALVE

CROSS-REFERENCE TO RELATED APPLICATIONS

This application is a non-provisional of and claims the benefit of U.S. Provisional Patent Application No. 63/011,915, filed on Apr. 17, 2020, the entire contents of which are incorporated herein by reference.

FIELD OF THE INVENTION

The present disclosure relates to faucets and flush valves, and more specifically, to a hydroelectric generator for use with a faucet and a flush valve.

BACKGROUND

Typical hydroelectric turbine generators are large and bulky. These hydroelectric generators are only capable of being installed at a specific position on a faucet or flush valve due to size, weight, and shape constraints of the hydroelectric generator.

SUMMARY

The ability to incorporate a hydroelectric generator into a plumbing fixture extends the life of the fixture by tapping into electricity generated by the usual flow of water through the fixture. The electricity generated by the hydroelectric generator can be harvested and stored for later use by the fixture. The flexibility of the configuration of the hydroelectric generator assembly, as described herein, provides for an efficient generation of electricity and modularity for installation depending on customer needs.

In one aspect, the invention provides a plumbing system for generating electrical power, the plumbing system including a hydroelectric generator assembly configured to generate power, a power source arranged in parallel with the hydroelectric generator assembly, an interconnecting power harness in communication with the hydroelectric generator assembly and the power source, and a plumbing fixture in communication with the interconnecting power harness, wherein the plumbing fixture includes a valve and a sensor configured to detect the presence of a user, wherein the hydroelectric generator assembly is configured to provide power to the valve.

In another aspect, the invention provides a plumbing system for generating and storing electrical power, the plumbing system including a hydroelectric generator assembly configured to generate power, a power bank configured to store power generated by the hydroelectric generator assembly, a first power source arranged in parallel with the hydroelectric generator assembly and in communication with the power bank, a plumbing fixture in communication with the power source, wherein the plumbing fixture includes a valve and a sensor configured to detect the presence of a user, and an end point device including an electronic processor, the electronic processor powered by a second power source local to the end point device, wherein the end point device is in communication with the power bank, the hydroelectric generator assembly, and the plumbing fixture In yet another aspect, the invention provides a plumbing system for generating and storing electrical power within a facility, the plumbing system including a hydroelectric generator assembly configured to generate power, a power bank configured to store power generated by the hydroelectric generator assembly, a plurality of power sources in communication with the power bank, a plurality of plumbing fixtures associated with the facility, wherein each of the plurality of plumbing fixtures are in communication with the power source, and an end point device in communication with the power bank, the hydroelectric generator assembly, and the plurality of plumbing fixtures, the end point device including an electronic processor configured to receive data from at least one of the plurality of plumbing fixtures and transmit the data to a remote device.

Other aspects of the disclosure will become apparent by consideration of the detailed description and accompanying drawings.

BRIEF DESCRIPTION OF THE DRAWINGS

FIGS. 5A-5G are side views of the faucet assembly of FIG. 4, including the hydroelectric generator assembly of FIG. 1 positioned at various locations.

FIG. 11 is a side view of the flush valve assembly of FIG. 8, including the hydroelectric generator assembly of FIGS. 7A-7B positioned at an alternative position.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Figure 1:
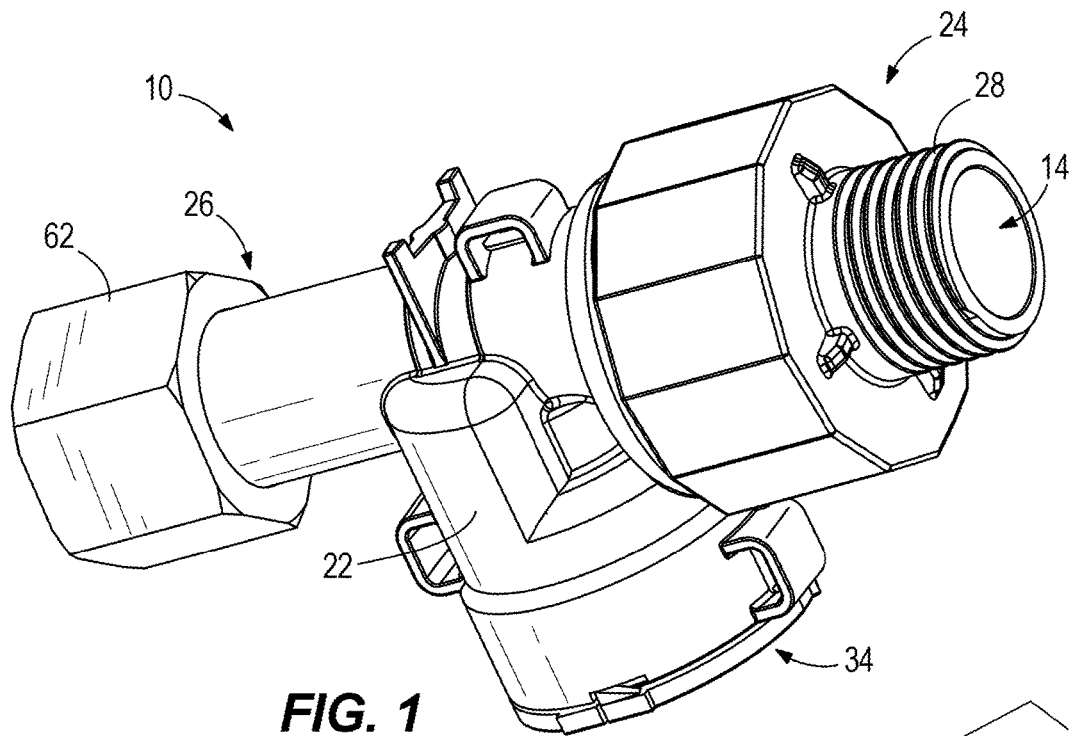
FIG. 1 is a perspective view of a hydroelectric generator assembly embodying the invention.
Figure 2:
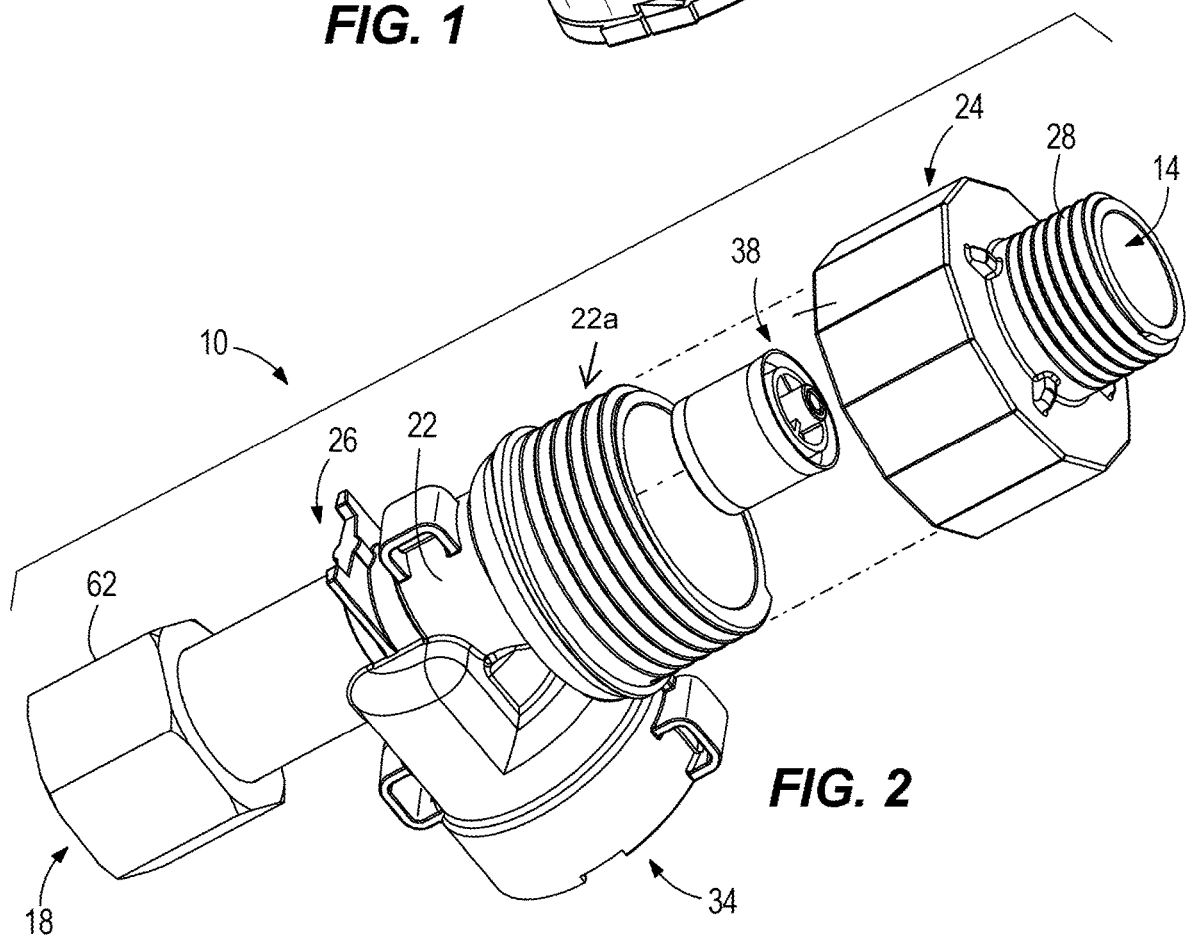
FIG. 2 is another perspective view of the hydroelectric generator assembly of FIG. 1.

FIGS. 1-2 illustrate a hydroelectric generator assembly 10 according to an embodiment of the invention. The hydroelectric generator assembly 10 includes an inlet 14 and an outlet 18, such that the inlet 14 receives water from a water supply and dispenses water at the outlet 18.

The hydroelectric generator assembly 10 is modular and may be positioned at various locations within a faucet assembly 100 in order to extract electrical energy from the water supply, as will be described in more detail below. The hydroelectric generator assembly 10 is operable to extract kinetic energy from water flowing into the inlet 14 of the hydroelectric generator assembly 10 and convert the kinetic energy into electrical energy.

Figure 3:
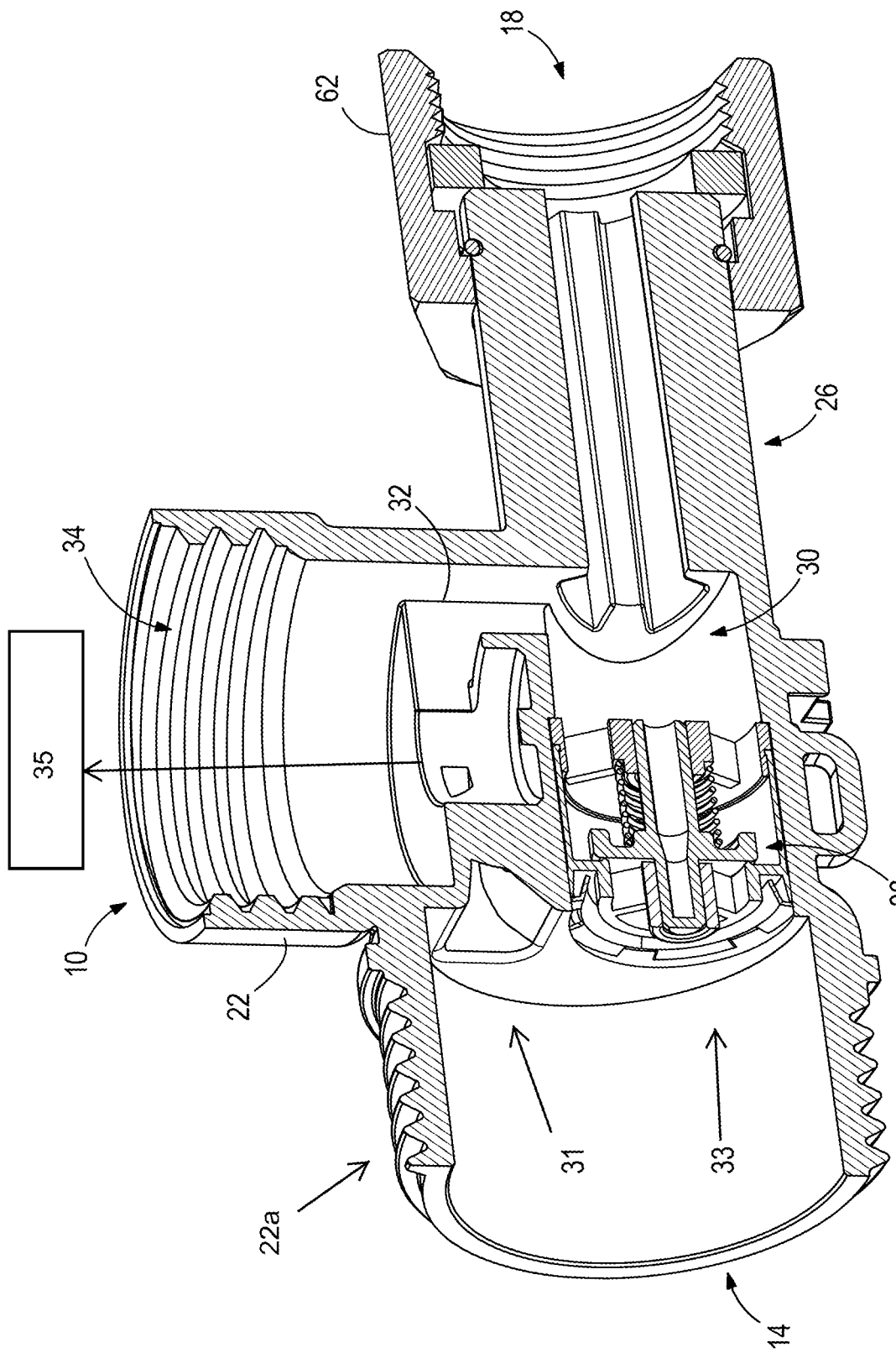
FIG. 3 is a perspective, cross-sectional view of an alternative hydroelectric generator assembly embodying the invention.

With reference to FIGS. 1-3, the hydroelectric generator assembly 10 includes a main housing 22, a coupling 24, and an extension 26 of the housing 22. The hydroelectric generator assembly 10 additionally includes the inlet 14, which receives water from a water supply, and the outlet 18, which dispenses water out of the hydroelectric generator assembly 10. The housing 22 includes a first chamber 30 having an upper section and a lower section. The first chamber 30 includes a first flow path 31 through the upper section and a second flow path 33 through the lower section for the water after it enters the inlet 14 and traverses to get to the outlet 18.

With reference to FIG. 3, the upper section of the first chamber 30 includes an AC generator assembly 32 including a turbine positioned on a drive shaft. The AC generator assembly 32 includes a rotor and a stator and is positioned on a first end of the drive shaft. The stator includes several blades positioned around the rotor. The AC generator assembly 32 can be embodied as a three-phase AC brushless motor. However, the AC generator assembly 32 may include alternative configurations. The turbine is positioned on a second end of the drive shaft, opposite the first end. The turbine is coupled to the rotor and the stator via the drive shaft. The turbine includes several blades circumferentially spaced around the drive shaft and are directly positioned within a flow path of the water. When water enters the hydroelectric generator assembly 10 via the inlet 14 and through the first flow path, the blades of the turbine rotate, converting the energy of the flowing water into mechanical energy. The blades direct a flow of water toward the rotor, causing the rotor to spin. Rotation of the rotor subsequently causes rotation of the drive shaft, thereby generating electrical current.

The lower section of the first chamber 30 is configured to receive an in-line check valve 38 to control the flow rate of the water in the first flow path 31 and the second flow path 33, and, which provides optimal performance of the turbine.

The second chamber 34 includes attachment points to connect to the power storage device to store electrical energy harvested from the hydroelectric generator assembly 10, as will be described in more detail below.

With continued reference to FIGS. 1-2, the coupling 24 is a cylindrical cap coupled to a first end 22a (FIG. 2) of the main housing 22. The coupling 24 includes a port 28, which forms the inlet 14 of the hydroelectric generator assembly 10. Specifically, the port 28 is cylindrical and includes external threads, which allow the coupling 24 to couple the hydroelectric generator assembly 10 to a component within the faucet assembly 100. In some embodiments, the coupling 24 may additionally or alternatively include a flange to couple the hydroelectric generator assembly 10 to the faucet assembly 100. In some embodiments (FIG. 3), the port 28 may be positioned directly on the main housing 22, rather than including a separate, removable coupling 24.

Figure 4:
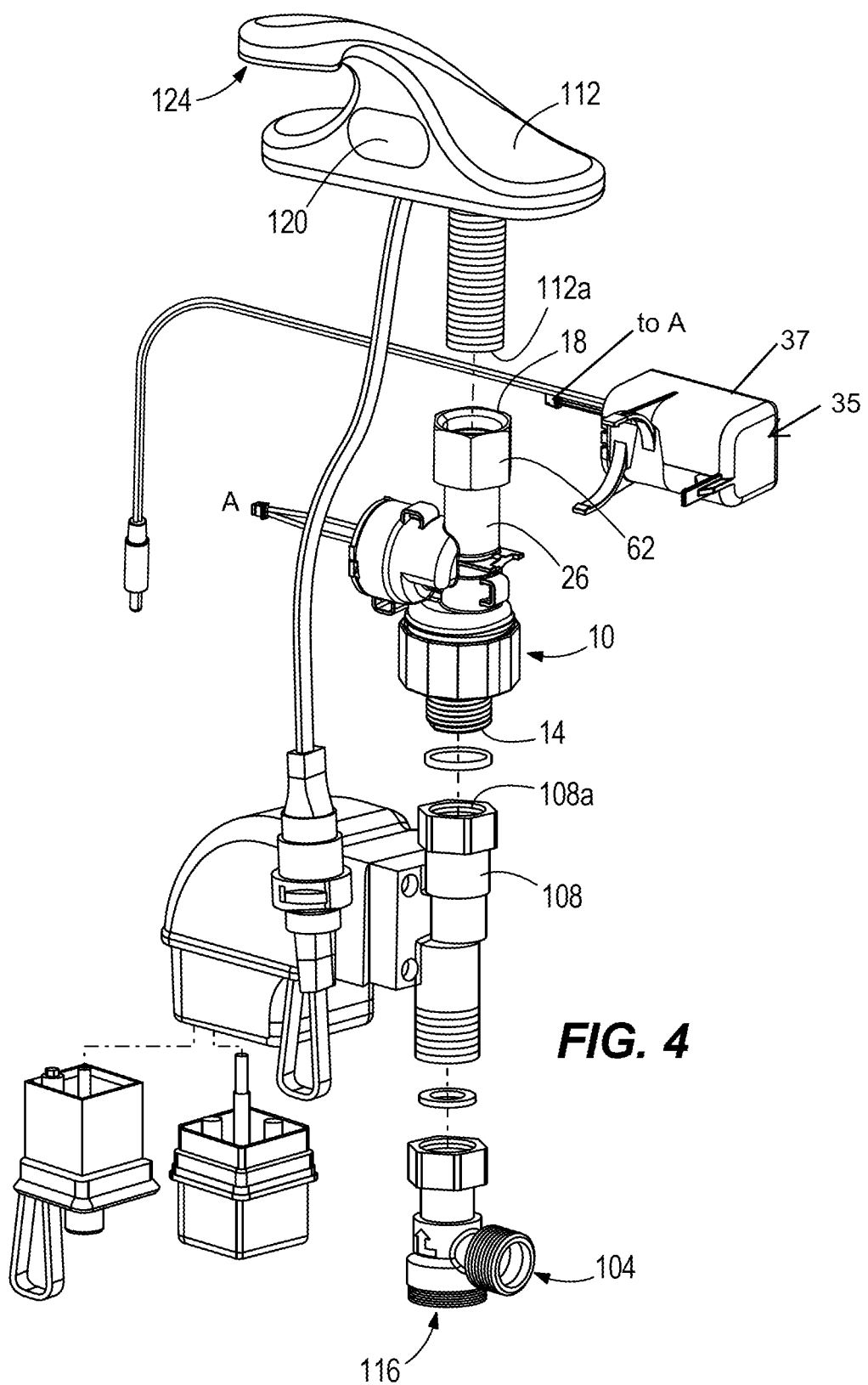
FIG. 4 is an exploded view of a faucet assembly including the hydroelectric generator assembly of FIG. 1.

With reference to FIG. 4, the hydroelectric generator assembly 10 is electrically connected to a power storage device 35, which is within housing 37 to store electrical energy harvested from the AC generator assembly 32. The power storage device 35 may include one or more batteries. The battery may be an alkaline battery, NiCD battery, a lithium ion battery, lithium-polymer battery, or rechargeable versions of these batteries, or include alternative configurations. The housing 37 includes an AC to DC converter and can include a controller, such as a processor.

The hydroelectric generator assembly 10 additionally includes an extraction mechanism (not shown) and a storage mechanism (not shown), as will be discussed in further detail below. The extraction mechanism is configured to extract electrical energy generated by the AC generator assembly 32, and the storage mechanism stores the electrical energy. The electrical energy is additionally capable of being supplied in various methods, as will be described in further detail below.

With reference to FIGS. 1-3, the housing extension 26 forms the outlet 18 of the hydroelectric generator assembly 10, such that water flows out of the hydroelectric generator assembly 10 via the extension 26. The extension 26 includes an outer surface having a threaded portion configured to receive a nut 62. The nut 62 is positioned on an outer surface of the extension 26 and is configured to spin relative to the extension 26. The nut 62 is configured to couple the hydroelectric generator assembly 10 to an incoming main waterline of the faucet assembly 100. One or more supply conduits may be positioned between the nut 62 and the faucet assembly 100.

With reference to FIG. 4, the hydroelectric generator assembly 10 may be positioned within the faucet assembly 100. The faucet assembly 100 includes a filter 104, a solenoid valve 108, and a faucet 112. The filter 104 filters water coming into the faucet assembly 100 via a faucet inlet 116, and is in connection with a water source. The solenoid valve 108 is configured to open and close, thereby allowing or preventing the flow of water through the faucet assembly 100. Specifically, when a user places their hands adjacent a sensor 120 positioned on the faucet 112 (or depresses an actuator), the solenoid valve 108 moves to an "open" position, thereby allowing the flow of water through the assembly 100. When the sensor 120 no longer indicates the presence of the user (or a predetermined amount of time passes), the solenoid valve 108 moves to a "closed" position, thereby preventing the flow of water through the assembly 100. The faucet 112 includes an outlet 124 of the faucet assembly 100 and dispenses water after it has passed through the assembly 100.

With continued reference to FIG. 4, the hydroelectric generator assembly 10 is typically positioned between the faucet 112 and the solenoid valve 108 of the faucet assembly 100. The hydroelectric generator inlet 14 is coupled to an outlet 108a of the solenoid valve 108, and the hydroelectric generator outlet 18 (e.g., the connection shaft 58) is coupled to an inlet 112a of the faucet 112 via the nut 62.

Figure 5G:
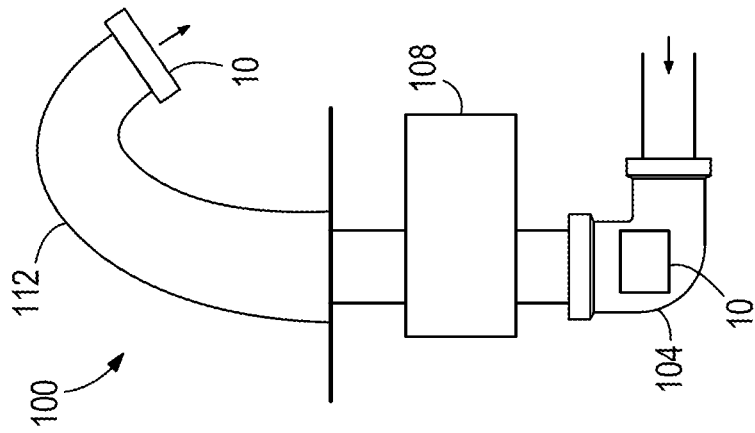
Figure 5F:
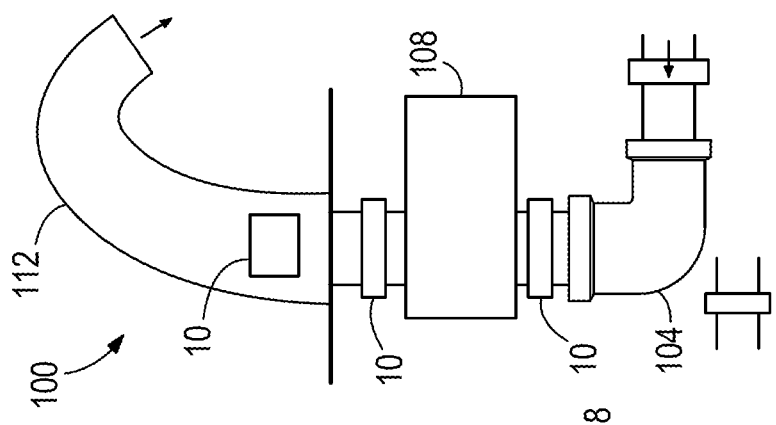
Figure 5E:
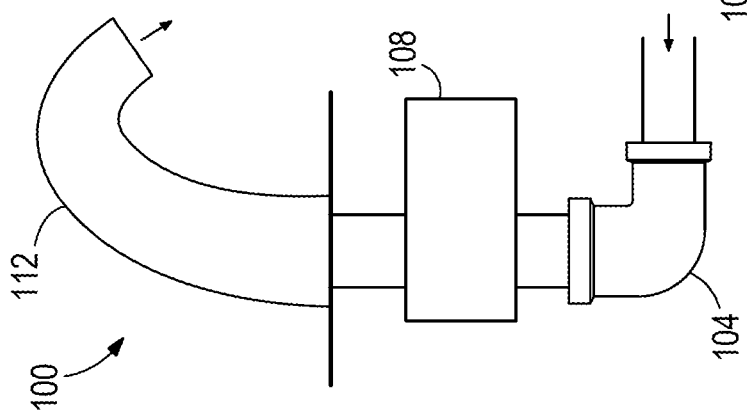

As illustrated in FIGS. 5A-5G due to the compact size of the modular hydroelectric generator assembly 10, the hydroelectric generator assembly 10 may be positioned at various different locations of the faucet assembly 100. With reference to FIGS. 5A and 5F, the hydroelectric generator assembly 10 may be positioned upstream of the faucet assembly inlet 116. In such instances, the hydroelectric generator assembly 10 may be positioned within a mainline of the faucet assembly 100 behind a wall, or may be positioned immediately upstream of the filter 104. Furthermore, in some embodiments (FIG. 5E), the hydroelectric generator assembly 10 may be positioned within a control valve 128 of the faucet assembly 100. Alternatively, the hydroelectric generator assembly 10 may be positioned downstream of the filter 104 and downstream of the solenoid valve 108. Alternatively, the hydroelectric generator assembly 10 may be positioned downstream of the solenoid valve 108 and upstream of the faucet 112. In such instances, the hydroelectric generator assembly 10 is positioned below a surface (e.g., countertop) which supports the faucet assembly 100.

With reference to FIGS. 5B and 5G, the hydroelectric generator assembly 10 may be positioned within the filter 104 of the faucet assembly 100. Alternatively, with reference to FIGS. 5C-5D, the hydroelectric generator assembly 10 may be positioned within the faucet 112. FIG. 5C illustrates the hydroelectric generator assembly 10 positioned adjacent the faucet inlet 112a, and FIG. 5D illustrates the hydroelectric generator assembly 10 positioned within the faucet assembly outlet 124. Alternatively, with reference to FIG. 5G, the hydroelectric generator assembly 10 may be positioned outside the faucet 112. Specifically, the hydroelectric generator assembly 10 is coupled to the faucet assembly outlet 124.

Positioning the hydroelectric generator assembly 10 at the various positions illustrated in FIGS. 5A-5G provides various advantages for the faucet assembly 100. Primarily, the modular size of the hydroelectric generator assembly 10 enables for optimal operating differential pressure loss for the turbine 42. The modular functionality of the hydroelectric generator assembly 10 also allows for more flexibility in the sizing, clearance, form factor, and access of the hydroelectric generator assembly 10 and the faucet assembly 100. Additionally, the ability to position the hydroelectric generator assembly 10 at various positions with the faucet assembly 100 simplifies installation and removal of the generator 10, while also facilitating maintenance and/or replacement.

Figure 6A:
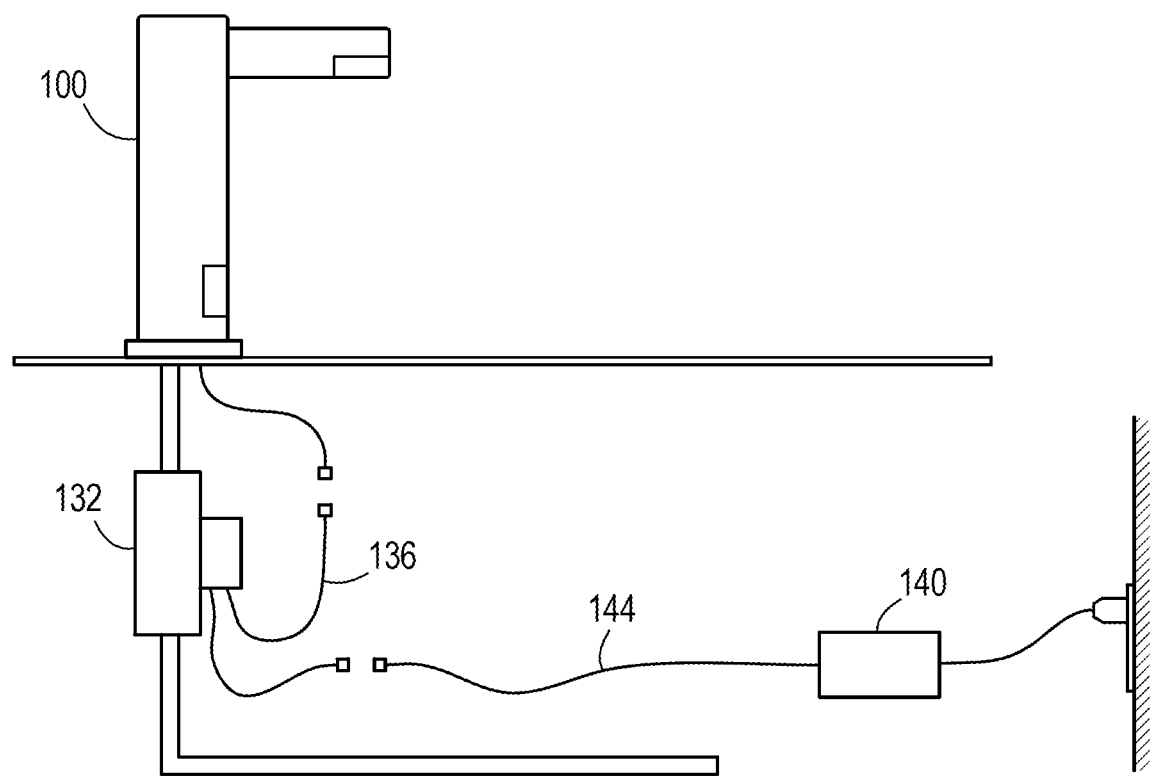
FIGS. 6A-6G are schematic wire diagrams of the faucet assembly.
Figure 6B:
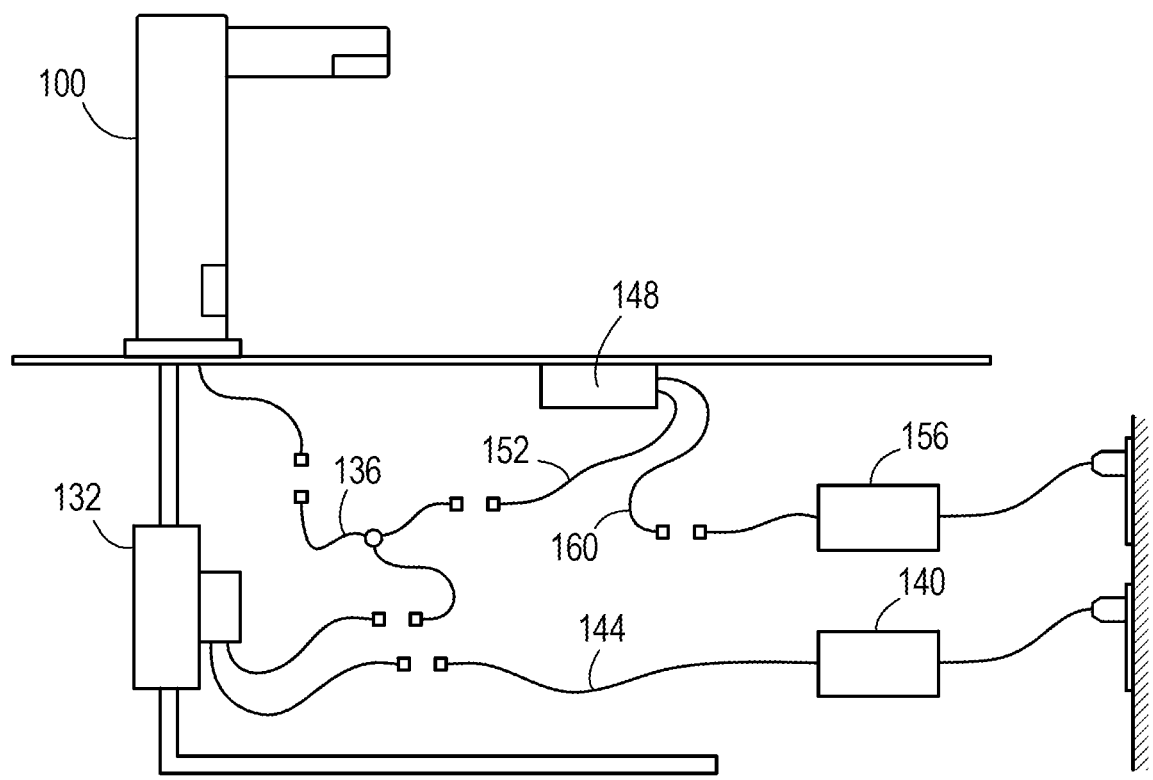
Figure 6C:
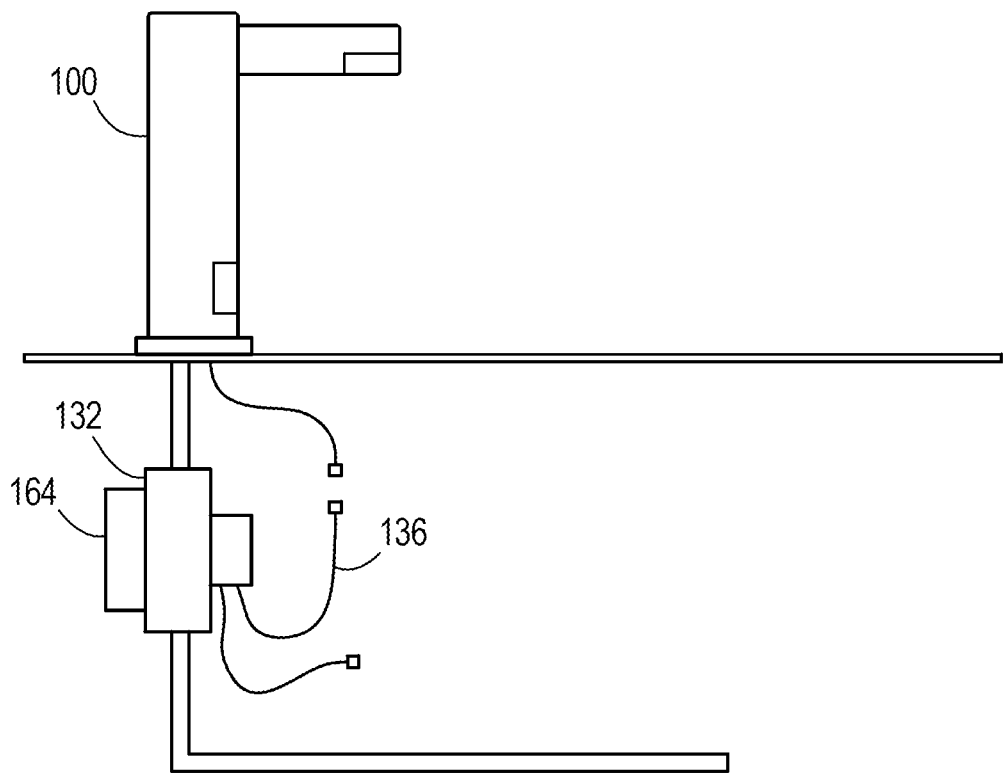
Figure 6D:
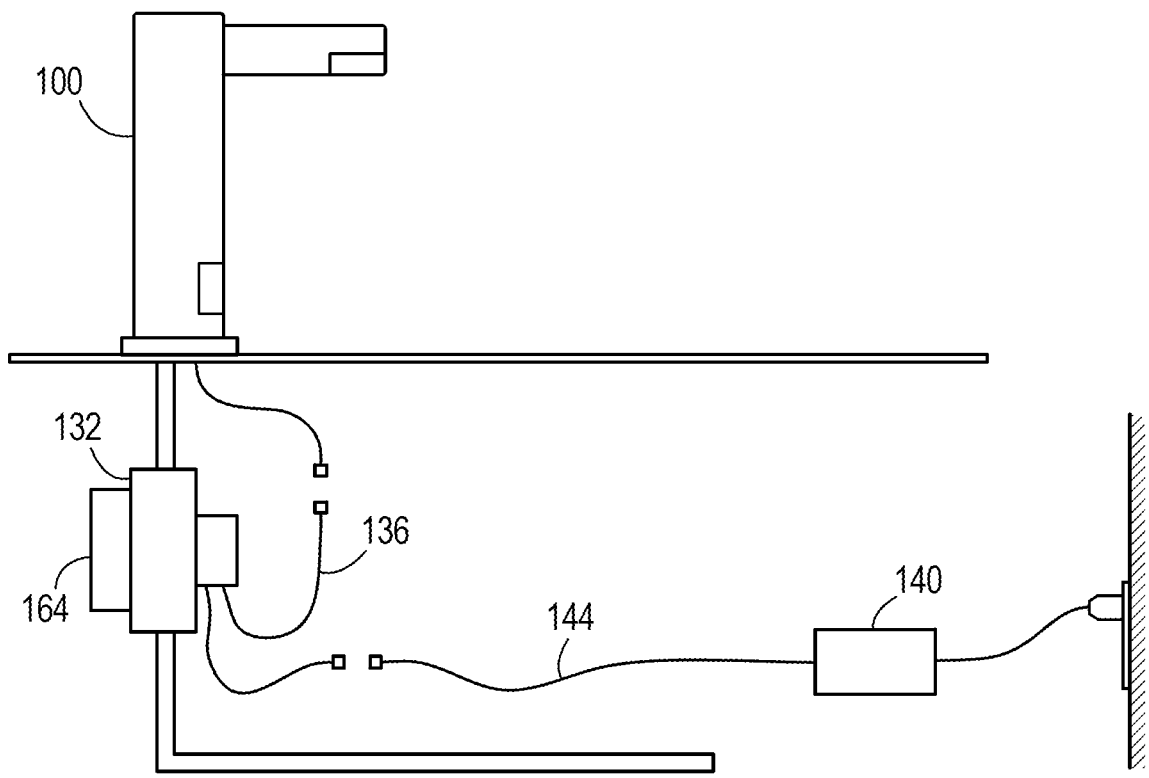
Figure 6E:
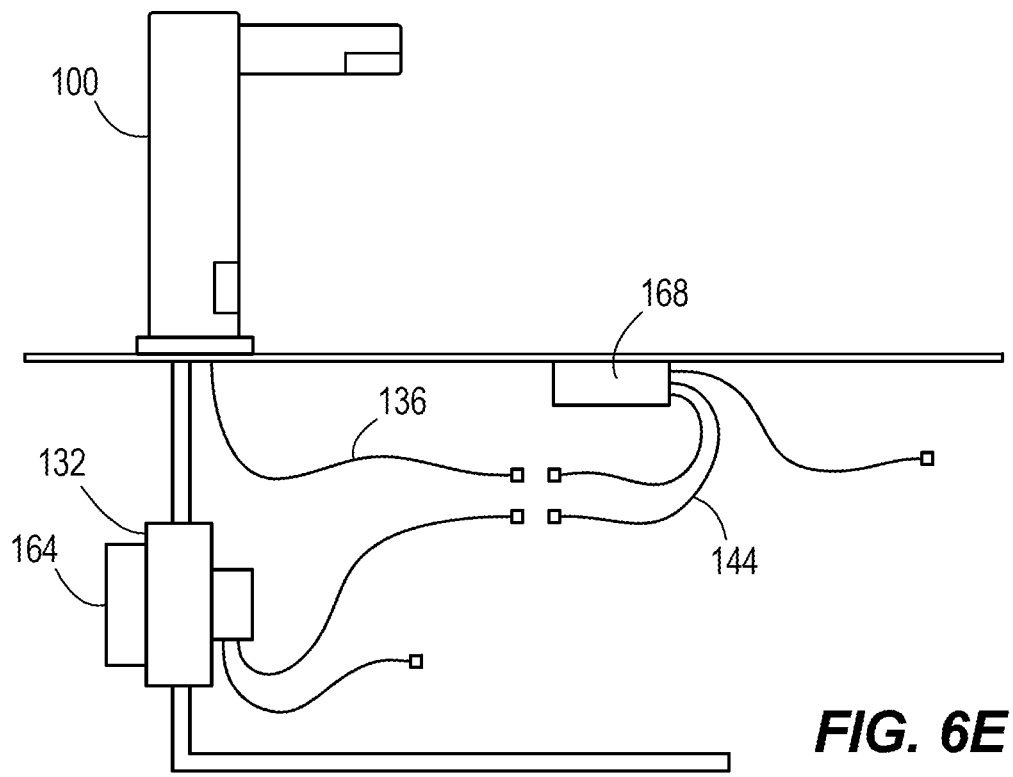
Figure 6F:
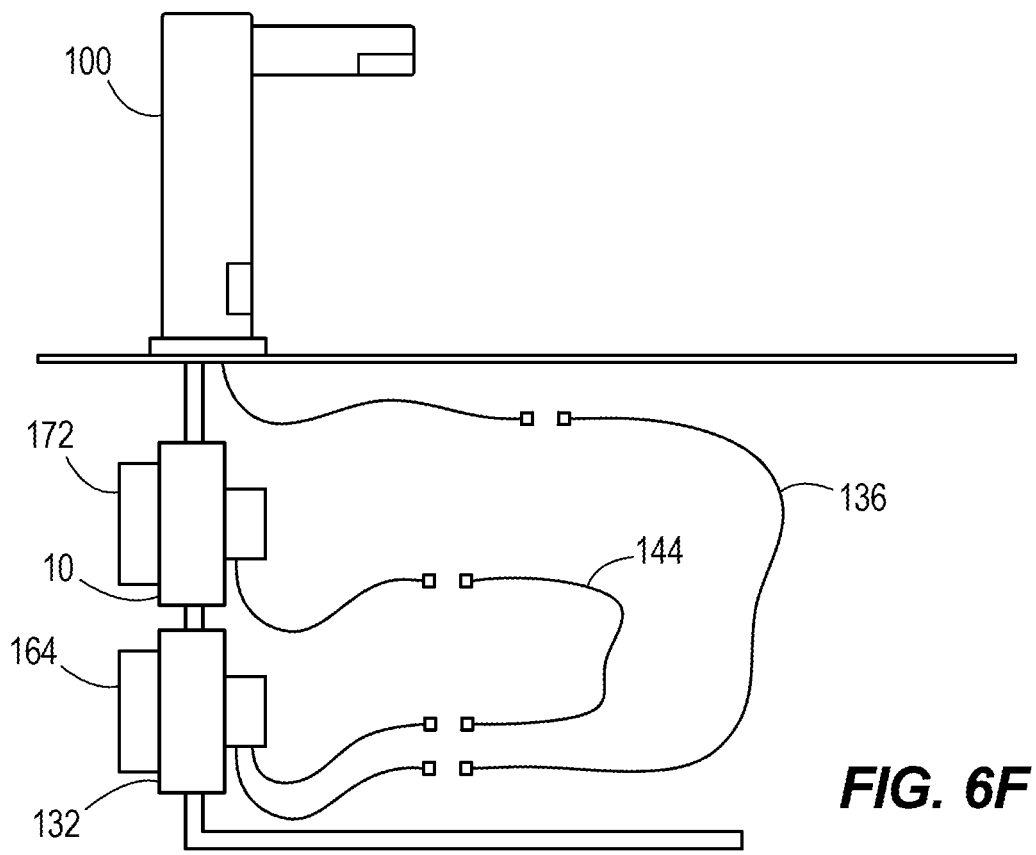
Figure 6G:
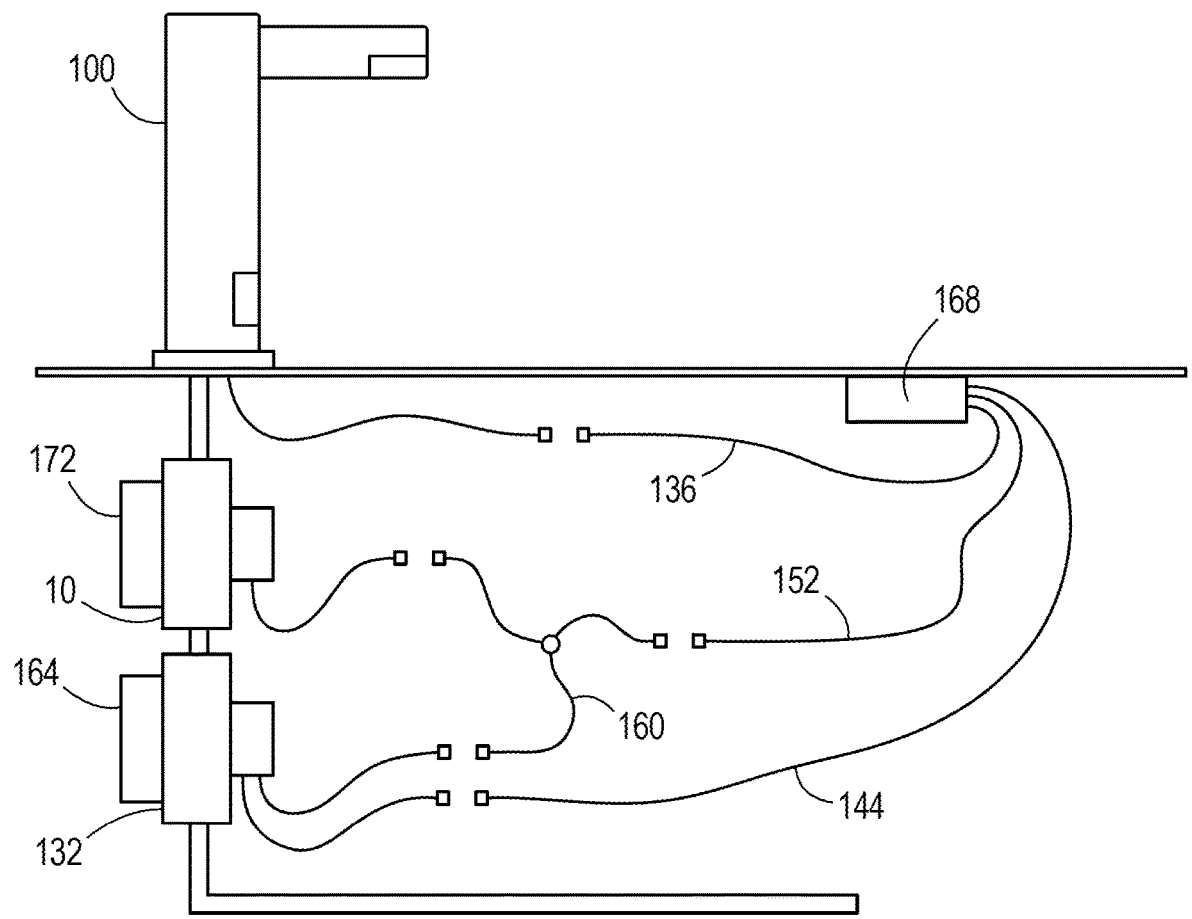

FIGS. 6A-6G schematically illustrate various wiring diagrams in connection with the hydroelectric generator assembly 10 and the faucet assembly 100. With reference to FIG. 6A, the faucet assembly 100 is in electrical connection with a gear-operated ceramic disc valve 132 via a first wire 136. The disc valve 132 can be used in place of the solenoid valve 108. The first wire 136 electrically links the sensor 120 to the valve 132 to operate the valve as described above. Furthermore, the gear-operated ceramic disc valve 132 is in electrical connection with a first power source 140 via a second wire 144, thereby connecting the first power source 140 with the faucet assembly 100. The first power source 140 may be an AC power source or a DC power source. The wires described herein and below may be implemented in a wireless manner via Bluetooth or other suitable wireless communication protocols.

In some embodiments (FIG. 6B), the faucet assembly 100 is in electrical connection with the gear-operated ceramic disc valve 132 via the first wire 136, and the gear operated disc-valve 132 is in electrical connection with the first power source 140 via the second wire 144. Additionally, the faucet assembly 100 is in electrical connection with a hardwired connected edge device 148 via a third wire 152, and the hardwired connected edge device 148 is in electrical connection with a second power source 156 via a fourth wire 160. The second power source 156 may provide an additional source of power to the faucet assembly 100 in the event that the first power source 140 fails. The second power source 156 may be an AC power source or a DC power source.

In some embodiments (FIG. 6C), the faucet assembly 100 is in electrical connection with the gear-operated ceramic disc valve 132 via the first wire 136. In such instances, the gear-operated ceramic disc valve 132 includes a first integrated battery pack 164, allowing the battery pack 164 to provide power to the ceramic disc valve 132 and the sensor 120 of the faucet assembly 100.

In some embodiments (FIG. 6D), the faucet assembly 100 is in electrical connection with the gear-operated ceramic disc valve 132 via the first wire 136, and the gear-operated ceramic disc valve 132 includes the first integrated battery pack 164. The gear-operated ceramic disc valve 164 is additionally in electrical connection with the first power source 140 via the second wire 144. The first integrated battery pack 164 may provide an additional source of power to the ceramic disc valve 132 and/or the sensor 120 of the faucet assembly 100 in the event that the first power source 140 fails.

In some embodiments (FIG. 6E), the faucet assembly 100 is in electrical connection with a battery connected edge device 168 via the first wire 136, and the ceramic disc valve 132 is in electrical connection with the battery connected edge device 168 via the second wire 144, thereby electrically linking the faucet assembly 100 and the ceramic disc valve 132 via the edge device 168. The ceramic disc valve 132 additionally includes the first integrated battery pack 164.

In some embodiments (FIG. 6F), the faucet assembly 100 is in electrical connection with the ceramic disc valve 132 via the first wire 136, and the ceramic disc valve 132 includes the first integrated battery pack 164. The ceramic disc valve 132 is additionally in electrical connection with the hydroelectric generator assembly 10 via the second wire 144, thereby electrically linking the faucet assembly 100 to the hydroelectric generator assembly 10 via the ceramic disc valve 132. The hydroelectric generator assembly 10 additionally includes a second battery pack 172 to provide power to the hydroelectric generator assembly 10 and/or the faucet assembly 100. The generator assembly 10 is fluidly connected to the faucet 100 and valve 132 as described above.

In some embodiments (FIG. 6G), the faucet assembly 100 is in electrical connection with the battery connected edge device 168 via the first wire 136. The battery connected edge device 168 is in electrical connection with the ceramic disc valve 132 via the second wire 144, and is in electrical connection with the hydroelectric generator assembly 10 via the third wire 152. The ceramic disc valve 132 is in electrical connection with the hydroelectric generator assembly 10 via the fourth wire 160. In such instances, the ceramic disc valve 132 and the hydroelectric generator assembly 10 include the integrated battery packs 164, 172. Because the faucet assembly 100, the ceramic disc valve 132, and the hydroelectric generator assembly 10 are all in electrical connection with the battery powered edge device 168, the edge device 168 is capable of distributing power between the faucet assembly 100, the ceramic disc valve 132, and the hydroelectric generator 10.

Figure 7B:
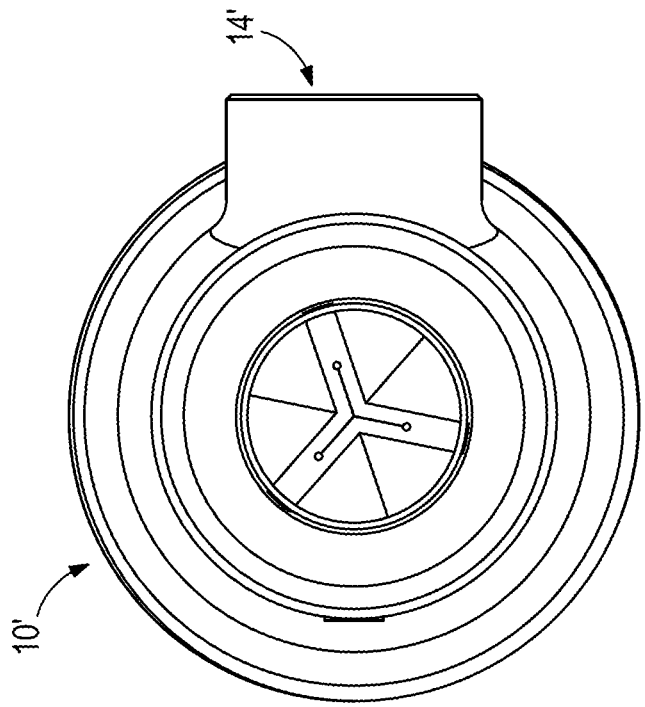
FIGS. 7A-7B are side views of an alternative hydroelectric generator assembly embodying the invention.
Figure 7A:
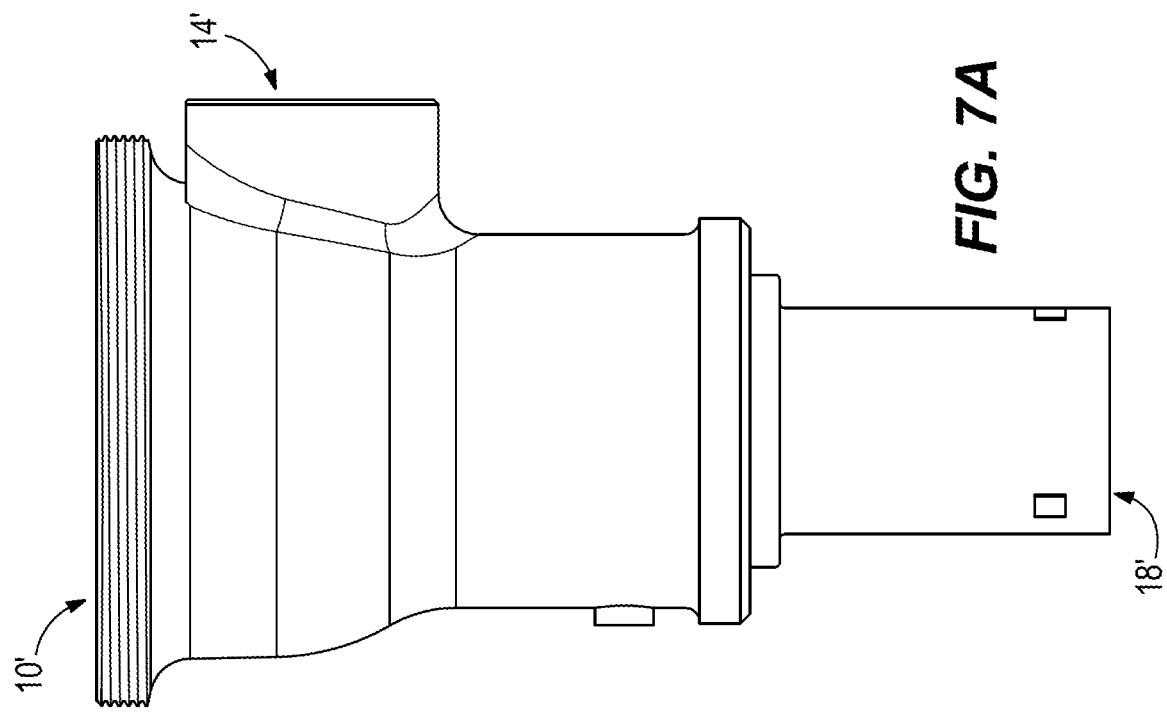

FIGS. 7A-7B illustrate an alternative hydroelectric generator assembly 10', with like components of the hydroelectric generator assembly 10 designated with an apostrophe. The hydroelectric generator assembly 10' is similar to the hydroelectric generator assembly 10 but is sized and shaped to be positioned within a flush valve assembly 200.

Figure 8:
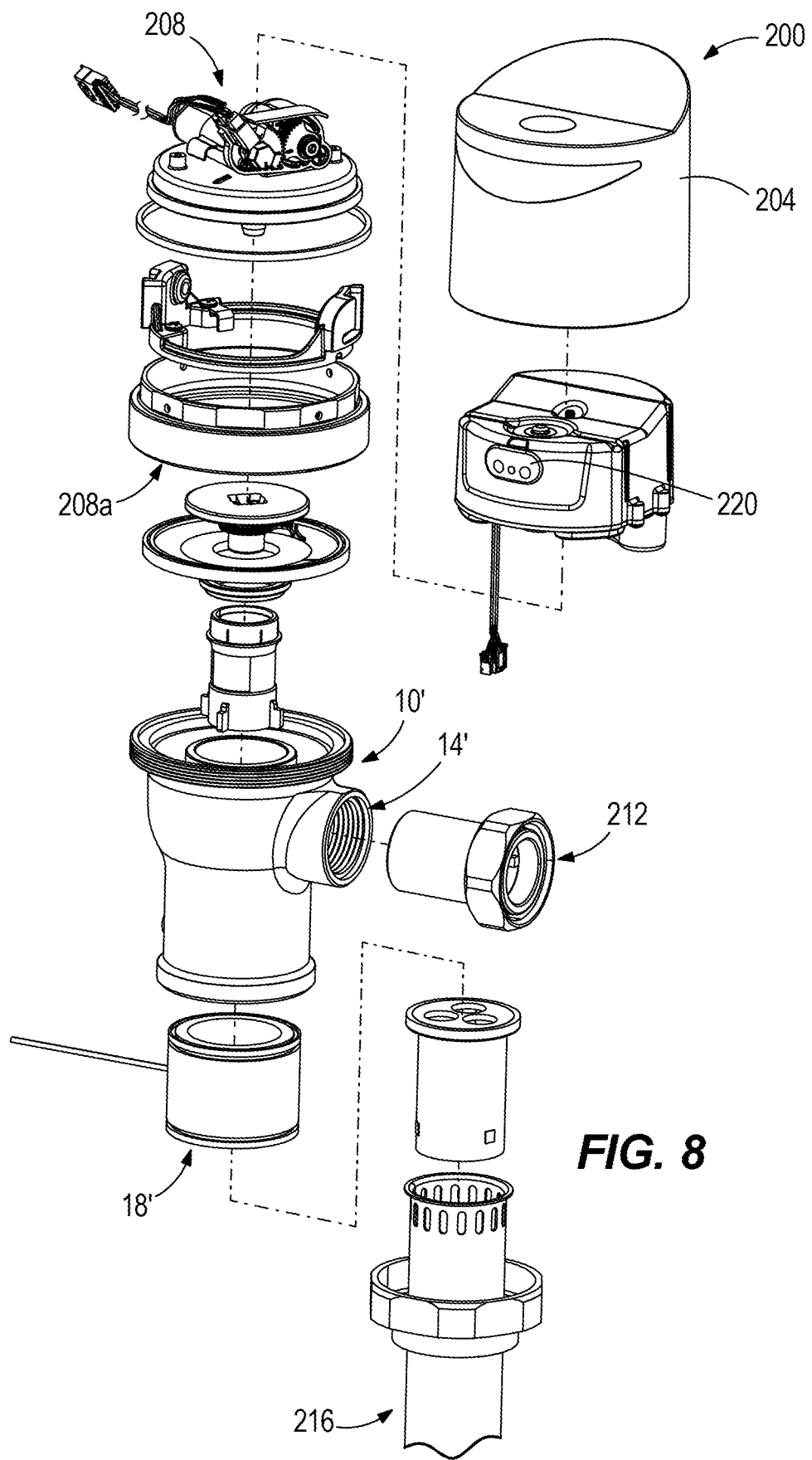
FIG. 8 is an exploded view of a flush valve assembly including the hydroelectric generator assembly of FIGS. 7A-7B.

With reference to FIG. 8, the flush valve assembly 200 includes a main housing 204 and a solenoid valve 208. As noted above, the solenoid valve 208 may be replaced with a ceramic disc valve. The main housing 204 includes an inlet 212, which is in connection with a water source, and an outlet 216, which dispenses water out of the flush valve assembly 200. The solenoid valve 208 is configured to open and close, thereby allowing or preventing the flow of water through the flush valve assembly 200. Specifically, when a user places their hands adjacent a sensor 220 positioned on the flush valve assembly 200 (or depresses an actuator), the control system instructs the solenoid valve 208 to move to an "open" position, thereby allowing the flow of water through the assembly 200. When the sensor 220 no longer indicates the presence of the user (or a predetermined amount of time passes), the control system instructs the solenoid valve 208 to move to a "closed" position, thereby preventing the flow of water through the assembly 200.

With continued reference to FIG. 8, the hydroelectric generator assembly 10' is typically positioned between the solenoid valve 208 and the outlet 216. The hydroelectric generator inlet 14' is coupled to an outlet 208a of the solenoid valve 208, and the hydroelectric generator outlet 18' (e.g., the connection shaft) is connected to the flush valve assembly outlet 216.

Figure 9:
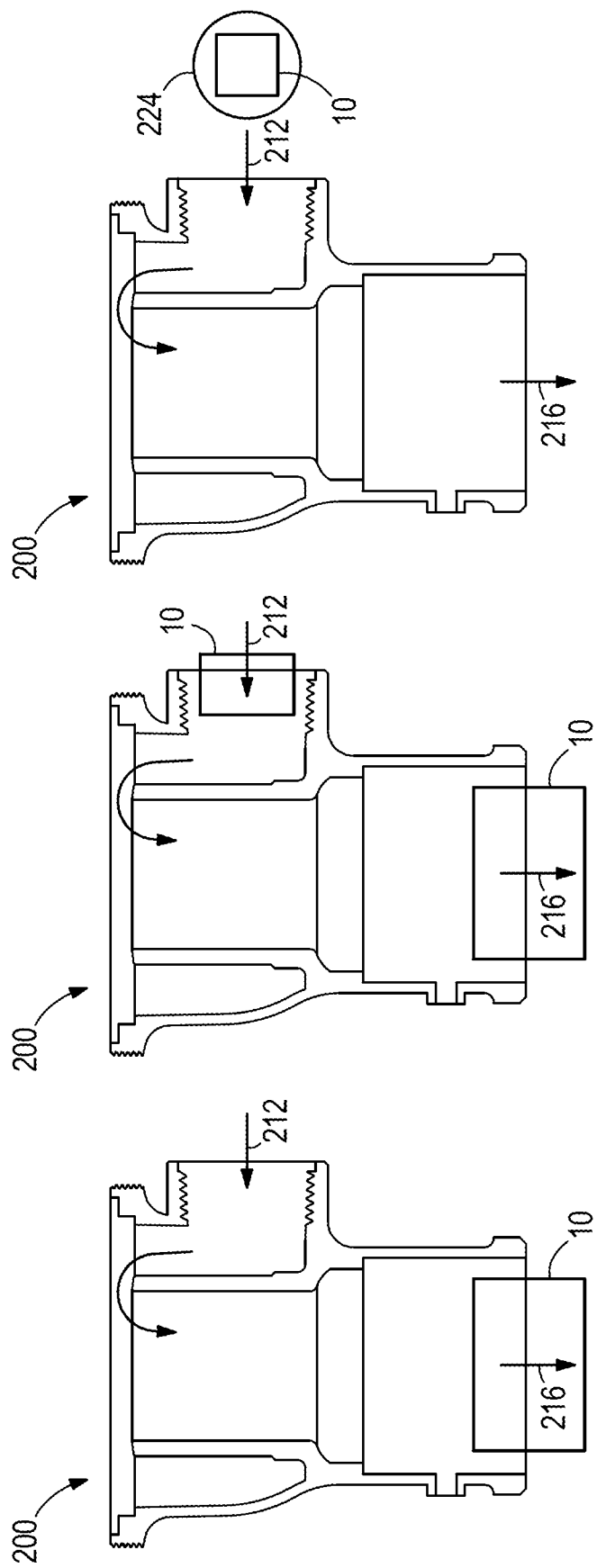
FIGS. 9A-9F are side views of the flush valve assembly of FIG. 10, including the hydroelectric generator assembly of FIGS. 7A-7B positioned at various locations.

As illustrated in FIGS. 9A-9G, due to the compact size of the modular hydroelectric generator assembly 10', the hydroelectric generator assembly 10' may be positioned at various different locations of the flush valve assembly 200. With reference to FIGS. 9A and 9B, the hydroelectric generator assembly 10' may be positioned at the flush valve outlet 216. Furthermore, in some embodiments (FIG. 9F), the hydroelectric generator assembly 10' may be positioned immediately upstream of the flush valve assembly outlet 216.

With reference to FIG. 9B, the hydroelectric generator assembly 10' may be positioned adjacent (e.g., immediately downstream) to the flush valve assembly inlet 212. In some embodiments, the hydroelectric generator assembly 10' may be positioned at the flush valve assembly inlet 212 or upstream of the flush valve assembly inlet 212. For example, with reference to FIG. 9C, the hydroelectric generator assembly 10' may be positioned within a stop valve 224, which is upstream of the flush valve assembly inlet 212. Alternatively, with reference to FIG. 9D, the hydroelectric generator assembly 10' may be positioned within a 90-degree valve 228, which is upstream of the flush valve assembly inlet 212. With reference to FIG. 9E, the hydroelectric generator assembly 10' may be positioned within the solenoid valve 208, or upstream of the solenoid valve 208.

Figure 10:
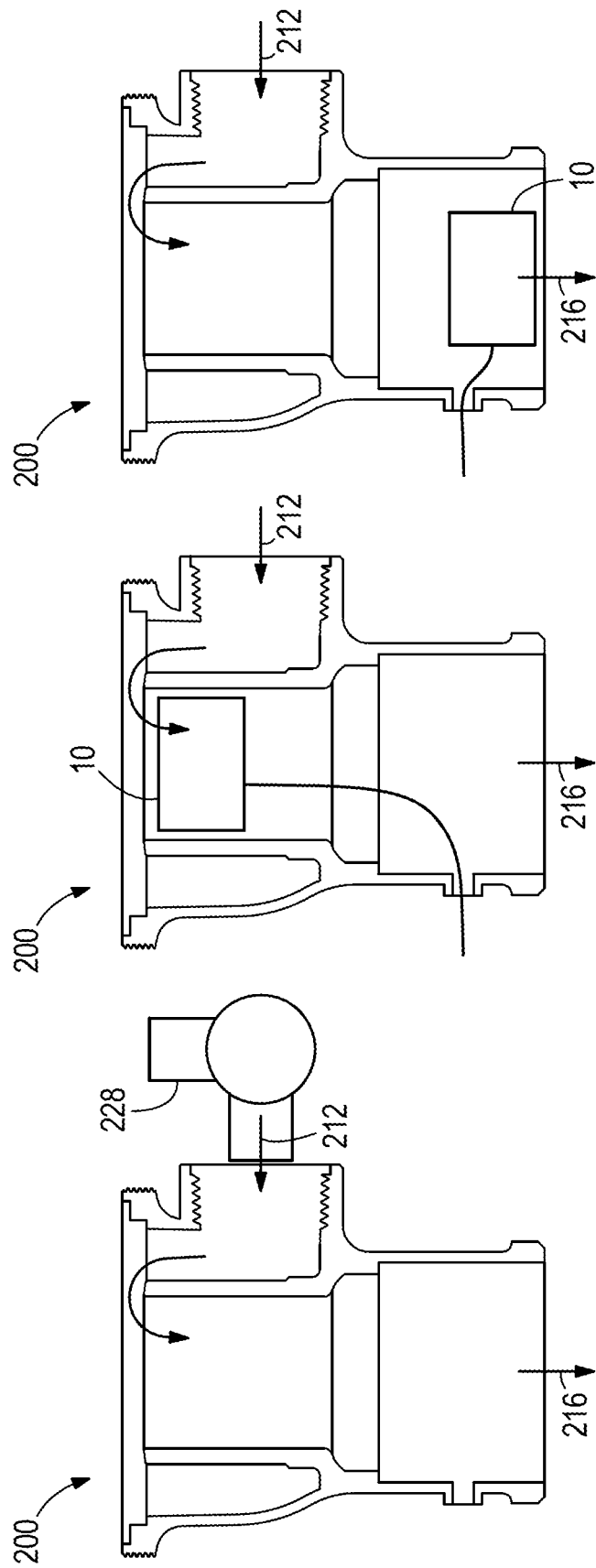
FIGS. 10A-10C are side views of a vacuum breaker tube of the flush valve assembly of FIG. 8, including the hydroelectric generator assembly of FIGS. 7A-7B positioned at various locations.

With reference to FIGS. 10A-10C, a vacuum breaker tube 300 may be positioned in connection with the flush valve assembly 200. The hydroelectric generator assembly 10' may be positioned at various locations of the vacuum breaker tube 300. With reference to FIG. 10A, the hydroelectric generator assembly 10' may be positioned on or immediately downstream of an outlet 304 of the vacuum breaker tube 300. Alternatively, with reference to FIG. 10C, the hydroelectric generator assembly 10' may be positioned on or immediately upstream of an inlet 308 of the vacuum breaker tube 300. The hydroelectric generator assembly 10' may alternatively be positioned at various locations within the vacuum breaker tube 300, as illustrated in FIG. 10B.

With reference to FIG. 11, the hydroelectric generator assembly 10' may be coupled to the flush valve assembly outlet 216, such that the hydroelectric generator 10' is removable and separate from the flush valve assembly 200. In such embodiments, various wires in connection with the hydroelectric generator assembly 10' are coupled to a surface of the flush valve 200, electrically coupling the hydroelectric generator 10' to the flush valve assembly 200.

Figure 12A:
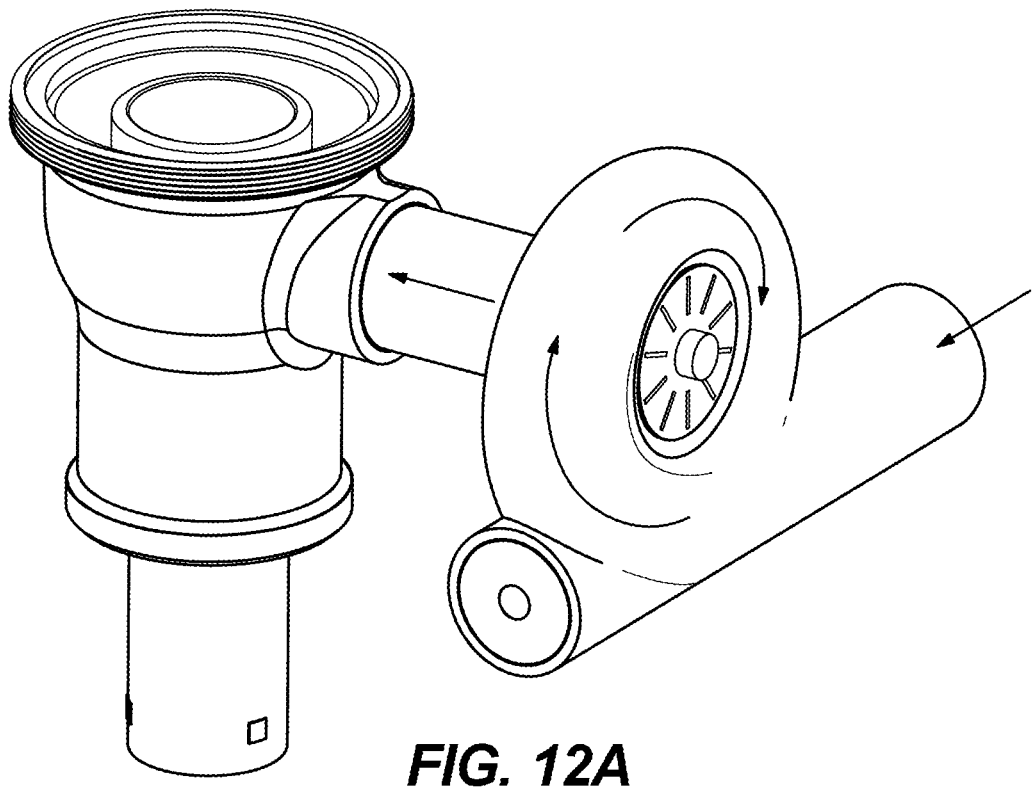
FIGS. 12A-12B are side views of the flush valve assembly of FIG. 8, including the hydroelectric generator assembly of FIGS. 7A-7B positioned at an alternative position.
Figure 12B:
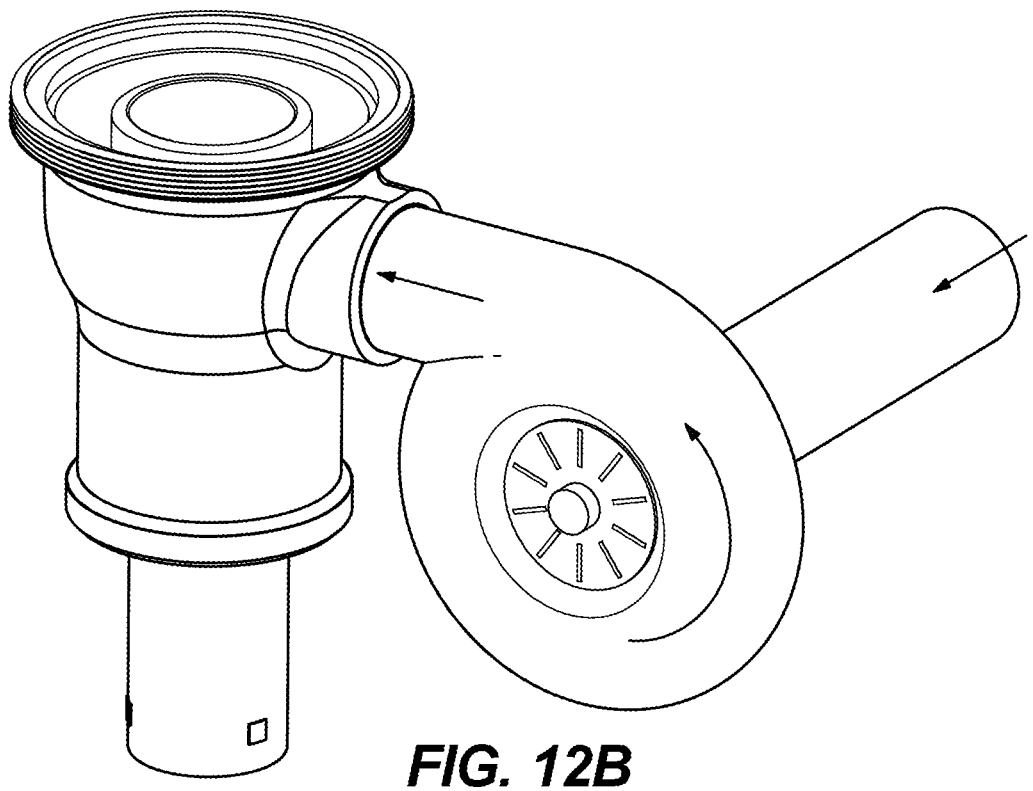

FIGS. 12A-12B illustrate another embodiment in which the hydroelectric generator assembly 10' is coupled to the flush valve assembly inlet 212. In such instances, the hydroelectric generator assembly 10' includes an integrated stop and can be mounted directly to a wall.

Positioning the hydroelectric generator assembly 10' at the various positions illustrated in FIGS. 9A-11 provides various advantages for the flush valve assembly 200. Primarily, the modular size of the hydroelectric generator assembly 10' enables for optimal operating differential pressure loss for the turbine 42'. The modular functionality of the hydroelectric generator assembly 10' also allows for more flexibility in the sizing, clearance, form factor, and access of the hydroelectric generator assembly 10' and the flush valve assembly 200. Additionally, the ability to position the hydroelectric generator assembly 10' at various positions within the flush valve assembly 200 simplifies installation and removal of the generator assembly 10', while also facilitating maintenance and/or replacement.

As previously mentioned, the hydroelectric generator assembly 10, 10' includes the extraction mechanism operable to extract electrical energy generated by the AC generator assembly 32. In the illustrated embodiments, the extraction mechanism is a wire extending from the AC generator assembly 32 to the power storage device. In some embodiments, the energy generated by the AC generator assembly 32 is single-phase AC. In some embodiments, the extraction mechanism may include an inline bypass for optimal power extraction.

In some embodiments, the hydroelectric generator assembly 10, 10' may alternatively include a spring contact coupled to the turbine. In such instances, the housing 22, 22' includes a corresponding metal contact. The spring contact and the housing contact may be coupled in order to transfer energy from the turbine to the power storage device. In some embodiments, the hydroelectric generator assembly 10, 10' may include an AC/DC converter. In such instances, the AC/DC converter includes suitable electronics, which are operable to transfer electrical energy from the turbine to the power storage device (e.g., one or more batteries.

The power extraction mechanism may additionally include a pressure detection mechanism for measuring the pressure of the turbine during operation. The pressure detection mechanism may measure a differential pressure of the turbine over the course of operation. If the differential pressure exceeds a predetermined value, the controller may detect that a leak has occurred within the turbine.

In some embodiments, the extraction mechanism may use an inductive coupling to transfer electric energy (e.g., charge) to the battery. However, in alternative embodiments, the extraction mechanism may implement alternative methods to wirelessly charge the battery.

In some embodiments, the power extraction mechanism may additionally or alternatively include a solar mechanism. The solar mechanism includes a solar panel positioned on the housing 22, 22' of the hydroelectric generator assembly 10, 10', which harvests light from the surrounding environment. The solar panel may operate in tandem with the turbine to collect additional energy.

As previously mentioned, the hydroelectric generator assembly 10, 10' includes the storage mechanism operable to store electrical energy extracted via the extraction mechanism. In the illustrated embodiments, the storage mechanism is the rechargeable, lithium-ion battery. In some embodiments, the storage mechanism may be an alternative type of rechargeable, or non-rechargeable, battery. In still further embodiments, the storage mechanism may be one or more super capacitors.

In some embodiments, the storage mechanism may be a consolidated power bank for shared storage and usage (e.g., communal power). Alternatively, in some embodiments, the storage mechanism is a pressure cartridge. In such instances, the cartridges store electrical energy using gas cylinders. Alternatively, in some embodiments, the storage mechanism may be a spring or a flywheel configured to store power.

Figure 13:
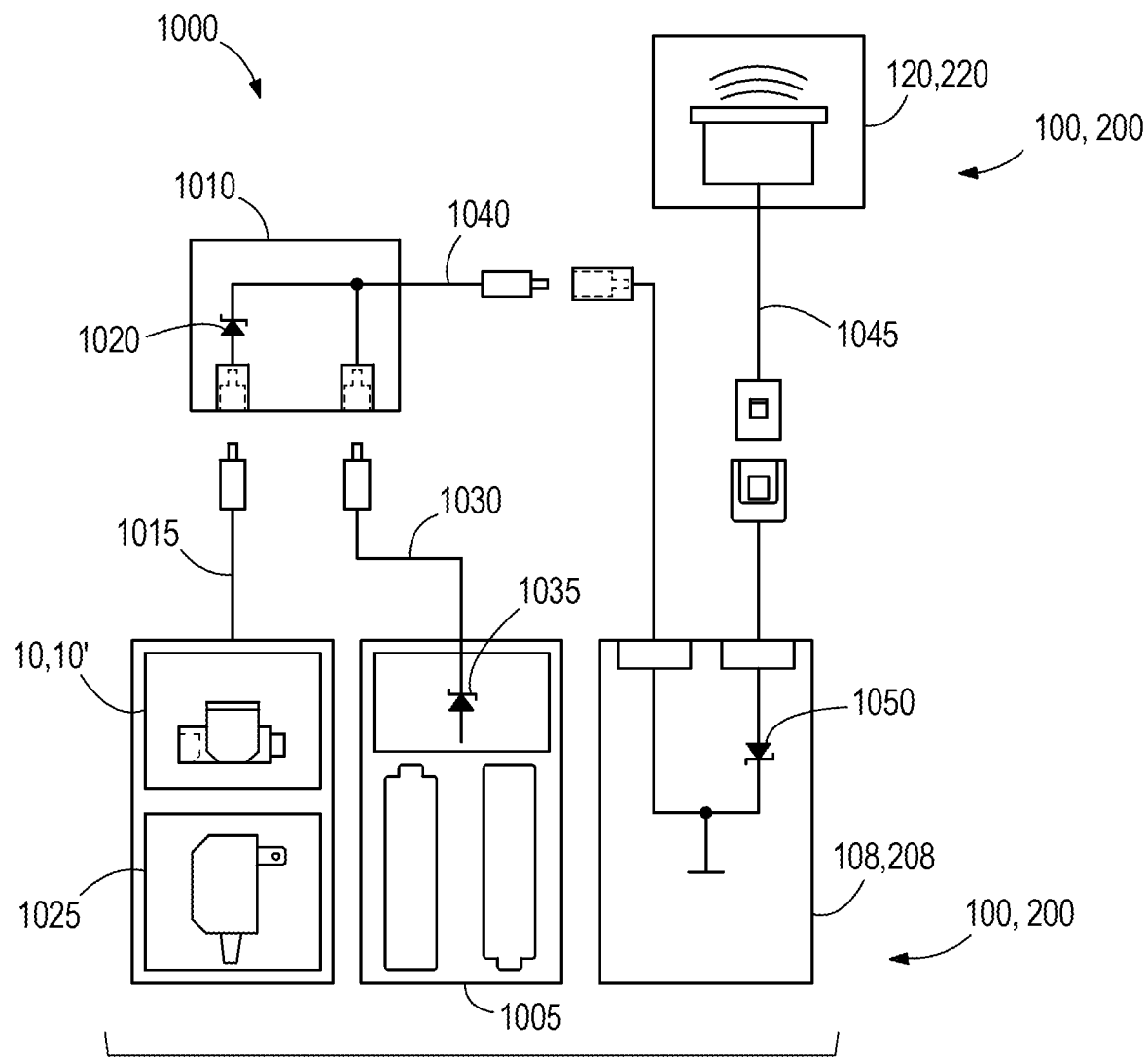
FIG. 13 is a schematic diagram of a system configured to generate and deliver power to the faucet assembly of FIG. 4 and/or the flush valve assembly of FIG. 8.

FIG. 13 illustrates a system 1000 capable of generating power and delivering power to the solenoid valve 108, 208 of the faucet assembly 100 and/or the flush valve assembly 200. The system 1000 includes one of the hydroelectric generators assembly 10, 10', the faucet assembly 100 and/or the flush valve assembly 200, a power source 1005, and an interconnecting power harness 1010. The generator assembly 10, 10', the faucet assembly 100 and/or the flush valve assembly 200, the power source 1005, and the interconnecting power harness 1010 are electrically connected via one or more wires.

With continued reference to FIG. 13, the hydroelectric generator assembly 10, 10' is in electrical connection with the interconnecting power harness 1010 via a first wire 1015. The interconnecting power harness 1010 includes a first diode 1020 (e.g., a blocking diode, a steering diode, a flyback diode, etc.). The first diode 1020 allows current to flow into the interconnecting power harness 1010 and prevents current from flowing out of the interconnecting power harness 1010. In some embodiments, the hydroelectric generator assembly 10, 10' may be replaced or used in conjunction with an AC power adapter source (e.g., a wall outlet) 1025.

The power source 1005 is in electrical connection with the interconnecting power harness 1010 via a second wire 1030. In the illustrated embodiments, the power source 1005 is an auxiliary battery pack and is arranged in parallel with the hydroelectric generator assembly 10, 10'. With continued reference to FIG. 13, the second wire 1030 includes a second diode 1035 (e.g., a blocking diode, a steering diode, a flyback diode, etc.) upstream of the power source 1005. The second diode 1035 allows current to flow out of the power source 1005 and prevents current from flowing into the power source 1005.

The interconnecting power harness 1010 is in electrical connection with the solenoid valve 108, 208 via a third wire 1040, and the solenoid valve 108, 208 is in electrical connection with the sensor 120, 220 of the faucet assembly 100 or the flush valve assembly 200 via a fourth wire 1045. The solenoid valve 108, 208 includes a third diode 1050 (e.g., a blocking diode, a steering diode, a flyback diode, etc.). The third diode 1050 allows current to flow into the solenoid valve 108, 208 and prevents current from flowing out of the solenoid valve 108, 208.

During operation, upon detection of a user via the sensor 120, 220, the solenoid valve 108, 208 is actuated. The power source 1005 provides power to the solenoid valve 108, 208 via the second wire 1030 and the third wire 1040. In the event that the power source 1005 is depleted, the hydroelectric generator assembly 10, 10' provides power to the solenoid valve 108, 208 via the first wired communication line 1015 and the third wire 1040.

Figure 14:
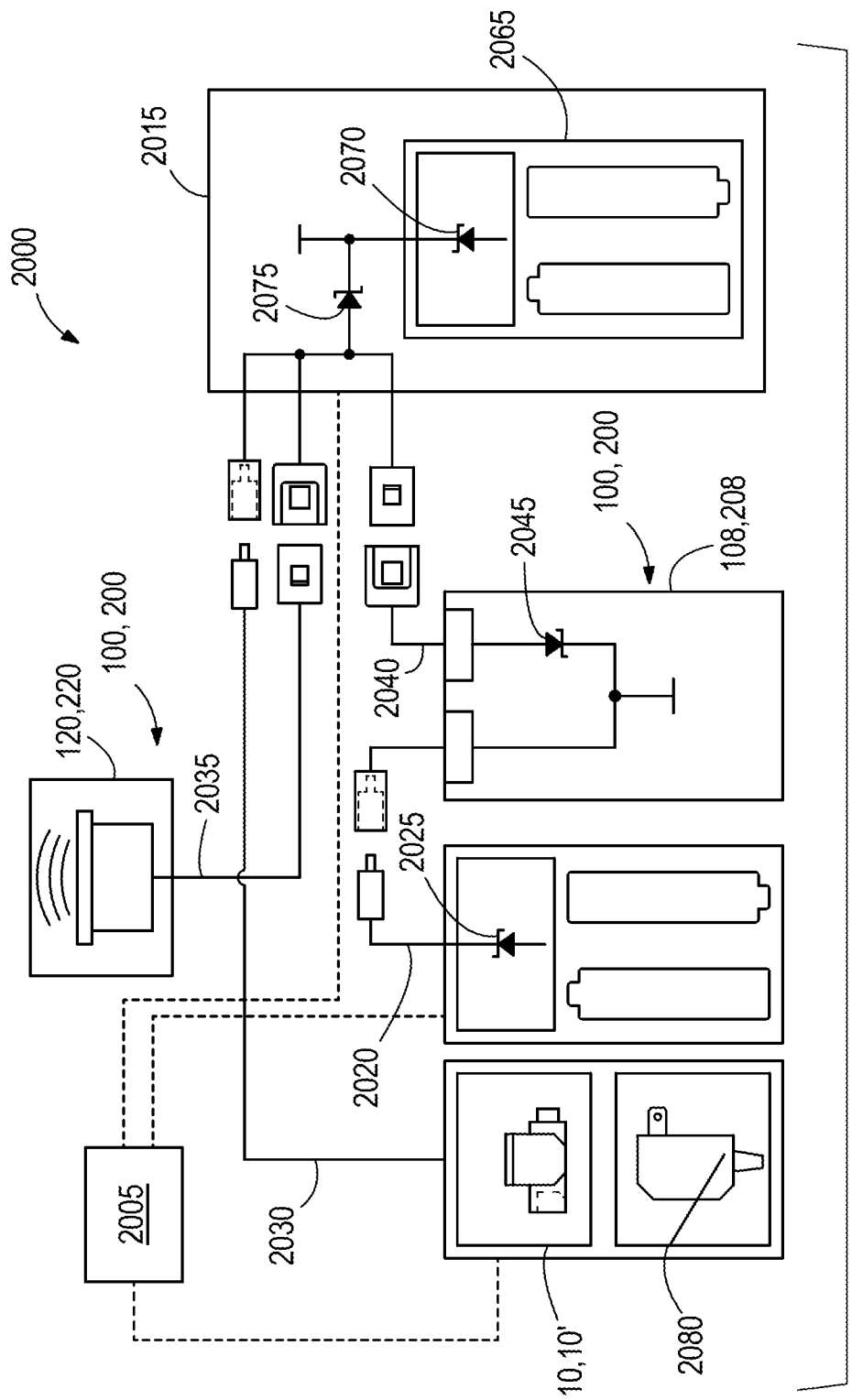
FIG. 14 is a schematic diagram of an alternative system configured to generate and deliver power to the faucet assembly of FIG. 4 and/or the flush valve assembly of FIG. 8.

FIG. 14 illustrates a system 2000 for generating and delivering the power to the solenoid valve of the faucet assembly 100 and/or the flush valve assembly 200 within a facility. The system 2000 is additionally capable of storing generated energy, as will be described in more detail below.

The system 2000 includes at least one of the hydroelectric generator assemblies 10, 10', the faucet assembly 100 and/or the flush valve assembly 200, a power bank 2005, a power source 2010, and an end point device 2015.

The generator assembly 10, 10', the faucet assembly 100 and/or the flush valve assembly 200, the power bank, the power source, and the battery powered endpoint communicate over one or more wired or wireless communication networks. Portions of the communication networks may be implemented using a wireless area network ("WAN"), such as the Internet or LoRa system, a local area network ("LAN"), such as Bluetooth™ network or Wi-Fi, and combinations or derivations thereof. Accordingly, components of the system may be configured to communicate via Bluetooth, Wi-Fi, Zigbee, LTE/Cellular, wired ethernet, RS485/RS232, or the like. Alternatively, or in addition, in some embodiments, one or more components of the system communicate directly as compared to through the communication network.

In the illustrated embodiment, the power bank is in communication with the hydroelectric generator assembly 10, 10', the power source 2010, and the end point device 2015. The power bank 2005 is configured to store electrical energy generated by the generator assembly 10, 10'. The power bank 2005 may recharge the power source 2010 and/or the end point device 2015 when they are depleted. In some embodiments, the hydroelectric generator 10, 10' may be replaced or used in conjunction with an AC power source (e.g., a wall outlet) 2080.

The power source 2010 is in communication with the solenoid valve 108, 208 via a first communication line 2020. In the illustrated embodiments, the power source 2010 is an auxiliary battery pack. With continued reference to FIG. 14, the first communication line 2020 includes a first diode 2025 (e.g., a blocking diode, a steering diode, a flyback diode, etc.) upstream of the power source 2010. The first diode 2025 allows current to flow out of the power source 2010 and prevents current from flowing into the power source 2010.

The end point device 2015 is in communication with the hydroelectric generator assembly 10, 10' via a second communication line 2030, the end point device 2015 is in communication with the sensor 120, 220 of the faucet assembly 100 and/or flush valve assembly 200 via a third communication line 2035, and the end point device 2015 is in communication with the solenoid valve 108, 208 via a fourth communication line 2040. The fourth communication line 2040 includes a second diode 2045 (e.g., a blocking diode, a steering diode, a flyback diode, etc.) upstream of the solenoid valve 108, 208. The second diode 2045 allows current to flow into the solenoid valve 108, 208 and prevents current from flowing out of the solenoid valve 108, 208.

Figure 15:
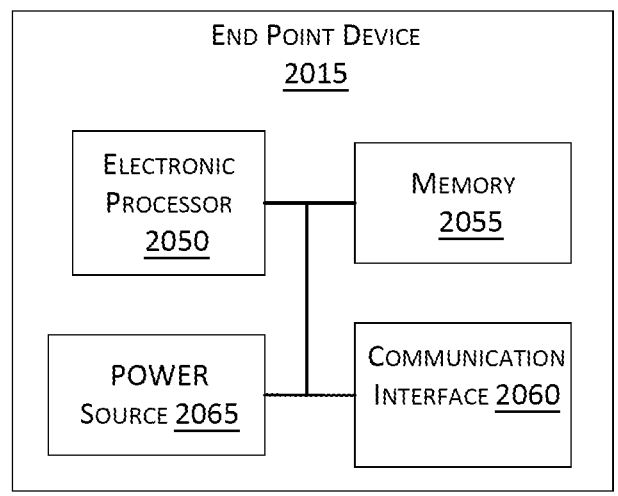
FIG. 15 is a schematic diagram of an end point device included in the system of FIG. 14.

With reference to FIG. 15, the end point device 2015 includes an electronic processor 2050, a memory 2055, a communication interface 2060, and a power source 2065. The electronic processor 2050, the memory 2055, the communication interface 2060, and the power source 2065 communicate wirelessly, over one or more communication lines or buses, or a combination thereof. The processor 2050 is configured to access and execute computer-readable instructions ("software") stored in the memory. The software may include firmware, one or more applications, program data, filters, rules, one or more program modules, and other executable instructions. For example, the software may include instructions and associated data for performing a set of functions, including the methods described herein. For example, in some embodiments, the electronic processor 2050 is configured to enable management and/or monitoring of the operation of the solenoid valve either directly or indirectly. In some embodiments, the electronic processor 2050 enables management and/or monitoring of the operation of the solenoid valve 108, 208 by receiving data from the solenoid valve 108, 208, converting the data for transmission, and enabling transmission of the converted data to, for example, a facility device, a server, a user device, etc. In some embodiments, the end point device 2015 may be in communication with multiple solenoid valves, or other fixtures within a facility. In such instances, the end point device 2015 may receive data from multiple solenoid valves.

As illustrated in FIG. 14, a third diode 2070 (e.g., a blocking diode, a steering diode, a flyback diode, etc.) is in communication with and positioned upstream from the power source 2065 of the end point device 2015. The third diode 2070 allows current to flow out of the power source 2065 and prevents current from flowing into the power source 2065. A fourth diode 2075 (e.g., a blocking diode, a steering diode, a flyback diode, etc.) is in communication with the second communication line 2030, the third communication line 2035, and the fourth communication line 2040. The fourth diode 2075 allows current to flow out of the hydroelectric generator assembly 10, 10', the solenoid valve 108, 208, and the sensor 120, 220 and prevents current from into the hydroelectric generator assembly 10, 10', the solenoid valve 108, 208, and the sensor 120, 220. A power end point 2080 is thereby formed between the third diode 2070 and the fourth diode 2075.

In some embodiments, one or more components of the end point device 2015 may be distributed among multiple devices, integrated into a single device, or a combination thereof. In some embodiments, the end point device 2015 may perform additional functionality described herein. In some embodiments, the end point device 2015 may include additional, different, or fewer components than those described above. In some embodiments, the system 2000 may include multiple end point devices.

During operation, upon detection of a user via the sensor 120, 220, the solenoid valve 108, 208 is actuated. The power source 2010 provides power to the solenoid valve 108, 208 via the first communication line 2020. Concurrently, power generated by the hydroelectric generator assembly 10, 10' is being stored in the power bank 2005, such that in the event that the power source 2010 or the power source 2065 of the end point device 2015 is depleted, the power bank 2005 provides power (e.g., charges) the power source(s) 2010, 2065. Therefore, the hydroelectric generator assembly 10, 10' and the power bank 2005 extend the life of the system 2000, as there is a continuous supply of power available for the power source(s) 2010, 2065. The use of the hydroelectric generator assembly 10, 10' and the power bank 2005 thereby allows the system 2000 to provide power to multiple devices (e.g., multiple solenoid valves, end point devices, other fixtures, etc.) within a facility.

Various features and advantages of certain embodiments are set forth in the following claims.

What is claimed is:

1. A plumbing system for generating electrical energy, the plumbing system comprising:
    a hydroelectric generator assembly configured to generate electrical energy; a power source arranged in a parallel circuit with the hydroelectric generator assembly;
    an interconnecting power harness in communication with the hydroelectric generator assembly and the power source, the interconnecting power harness including at least one diode that allows current to flow into the interconnecting power harness and prevents current from flowing out of the interconnecting power harness; and
    a plumbing fixture in communication with the interconnecting power harness, wherein the plumbing fixture includes a valve and a sensor configured to detect the presence of a user;
    wherein the hydroelectric generator assembly is configured to provide power to the valve.

2. The system of claim 1, wherein the power source is a rechargeable DC power source.

3. The system of claim 1, further comprising a diode in communication with the power source, wherein the diode is configured to allow current to flow out of the power source and prevent current from flowing into the power source.

4. The system of claim 1, further comprising an AC power source in communication with the interconnecting power harness.

5. The system of claim 1, wherein the hydroelectric generator assembly is configured to provide power to the valve when a charge level of the power source falls below a predetermined threshold value.

6. The system of claim 1, wherein the plumbing fixture is a faucet assembly.

7. A plumbing system for generating and storing electrical energy, the plumbing system comprising:
    a hydroelectric generator assembly configured to generate electrical energy;
    a power bank configured to store electrical energy generated by the hydroelectric generator assembly;
    a first power source arranged in a parallel circuit with the hydroelectric generator assembly and in communication with the power bank;
    a plumbing fixture in communication with the first power source, wherein the plumbing fixture includes a valve and a sensor configured to detect the presence of a user; and
    an end point device including an electronic processor, the electronic processor powered by a second power source local to the end point device, wherein the end point device is in communication with the power bank, the hydroelectric generator assembly, and the plumbing fixture.

8. The system of claim 7, wherein the power source is a rechargeable DC power source.

9. The system of claim 7, wherein the electronic processor is configured to receive data from the fixture, convert the data pursuant to a networking protocol, and enable transmission of the converted data to a remote device for virtual processing.

10. The system of claim 7, wherein the power bank is configured to charge at least one of the first power source and the second power source when a charge level of the one of the first power source and the second power source falls below a predetermined threshold value.

11. The system of claim 7, further comprising a diode in communication with the first power source, wherein the diode is configured to allow current to flow out of the first power source and prevent current from flowing into the first power source.

12. The system of claim 7, wherein the fixture is faucet assembly, and wherein in response to the sensor detecting the presence of a user, the valve is configured to move to an open position to allow the passage of water through the valve.

13. The system of claim 7, further comprising an AC power source in communication with the power bank.

14. A plumbing system for generating and storing electrical energy within a facility, the plumbing system comprising:
- a hydroelectric generator assembly configured to generate electrical energy;
- a power bank configured to store electrical energy generated by the hydroelectric generator assembly;
- a plurality of power sources in communication with the power bank;
- a plurality of plumbing fixtures associated with the facility, wherein each of the plurality of plumbing fixtures are in communication with the power source; and
- an end point device in communication with the power bank, the hydroelectric generator assembly, and the plurality of plumbing fixtures, the end point device including an electronic processor configured to receive data from at least one of the plurality of plumbing fixtures and transmit the data to a remote device.

15. The system of claim 14, wherein the power bank is configured to charge at least one of the plurality of power sources when a charge level of the at least one of the plurality of power sources falls below a predetermined threshold value.

16. The system of claim 14, wherein the end point device includes a second power source local to the end point device.

17. The system of claim 16, wherein the second power source is in communication with the power bank, wherein the power bank is configured to charge the second power source when a charge level of the second power source falls below a predetermined threshold value.

18. The system of claim 14, further comprising a diode in communication with at least one of the plurality of power sources, wherein the diode is configured to allow current to flow out of the one of the plurality of power sources and prevent current from flowing into the one of the plurality of power sources.

19. The system of claim 14, wherein at least one of the plurality of fixtures is faucet assembly, wherein the faucet assembly includes a valve and a sensor configured to detect the presence of a user, wherein the valve is in communication with at least one of the plurality of power sources.

20. The system of claim 19, wherein in response to the sensor detecting the presence of a user, the valve is configured to move to an open position to allow the passage of water through the valve.

* * * * *